US012646272B2

(12) United States Patent
Norris et al.

(10) Patent No.: US 12,646,272 B2
(45) Date of Patent: Jun. 2, 2026

(54) METHOD AND DEVICE FOR INVOKING A WRITING SURFACE

(71) Applicant: Apple Inc., Cupertino, CA (US)

(72) Inventors: Jeffrey S. Norris, Saratoga, CA (US); Michael J. Rockwell, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/686,926

(22) PCT Filed: Aug. 23, 2022

(86) PCT No.: PCT/US2022/041157
§ 371 (c)(1),
(2) Date: Feb. 27, 2024

(87) PCT Pub. No.: WO2023/034070
PCT Pub. Date: Mar. 9, 2023

(65) Prior Publication Data
US 2025/0037387 A1     Jan. 30, 2025

Related U.S. Application Data

(60) Provisional application No. 63/238,700, filed on Aug. 30, 2021.

(51) Int. Cl.
*G06T 19/00*       (2011.01)
*G06F 3/04815*     (2022.01)
(Continued)

(52) U.S. Cl.
CPC ........ *G06T 19/006* (2013.01); *G06F 3/04815* (2013.01); *G06F 3/04845* (2013.01); (Continued)

(58) Field of Classification Search
CPC ........... G06T 19/006; G06T 7/70; G06T 7/20; G06T 2200/24; G06T 2219/008; G06V 20/20; G06F 3/04815; G06F 3/04845
See application file for complete search history.

(56) References Cited

U.S. PATENT DOCUMENTS

| 10,976,804 B1 | 4/2021 | Atlas et al. |
| 11,054,896 B1 * | 7/2021 | Wilytsch ............. G06F 3/04815 |

(Continued)

FOREIGN PATENT DOCUMENTS

WO       WO-2021061349 A1 *   4/2021   ............. G06F 1/163

OTHER PUBLICATIONS

PCT International Search Report and Written Opinion dated Dec. 12, 2022, PCT International Application No. PCT/US2022/041157, pp. 1-13.

*Primary Examiner* — Lixi C Simpson
(74) *Attorney, Agent, or Firm* — Fernando & Partners, LLP

(57) ABSTRACT

In one implementation, a method for invoking a writing surface. The method includes: detecting a physical plane within an image stream of a physical environment, wherein the image stream is associated with a field-of-view (FOV) of the one or more exterior-facing image sensors; in response to detecting the physical plane within the image stream: obtaining pose values for the physical plane; and presenting, at a first location, an extended reality (XR) surface provided to display marks, wherein the first location is based on the pose values for the physical plane; and in response to movement of the physical plane, maintaining presentation of the XR surface at the first location.

24 Claims, 31 Drawing Sheets

(51) Int. Cl.
  G06F 3/04845 (2022.01)
  G06T 7/20 (2017.01)
  G06T 7/70 (2017.01)
  G06V 20/20 (2022.01)
(52) U.S. Cl.
  CPC .................. G06T 7/20 (2013.01); G06T 7/70 (2017.01); G06V 20/20 (2022.01); *G06T 2200/24* (2013.01); *G06T 2219/008* (2013.01)

(56) References Cited

U.S. PATENT DOCUMENTS

| | | | |
|---|---|---|---|
| 2012/0249416 A1* | 10/2012 | Maciocci ............. | H04N 9/3173 |
| | | | 345/156 |
| 2015/0269783 A1* | 9/2015 | Yun ......................... | G06F 3/017 |
| | | | 345/633 |
| 2018/0101986 A1 | 4/2018 | Burns et al. | |
| 2018/0158250 A1* | 6/2018 | Yamamoto .............. | G06F 3/011 |
| 2019/0114831 A1 | 4/2019 | Singh et al. | |
| 2019/0213792 A1* | 7/2019 | Jakubzak ................ | G06F 3/017 |
| 2019/0282324 A1* | 9/2019 | Freeman .............. | A61H 31/005 |
| 2021/0012574 A1 | 1/2021 | Fu et al. | |
| 2021/0110610 A1 | 4/2021 | Xu et al. | |
| 2022/0357805 A1* | 11/2022 | Azarov ................... | G06F 3/011 |

\* cited by examiner

Figure 2:
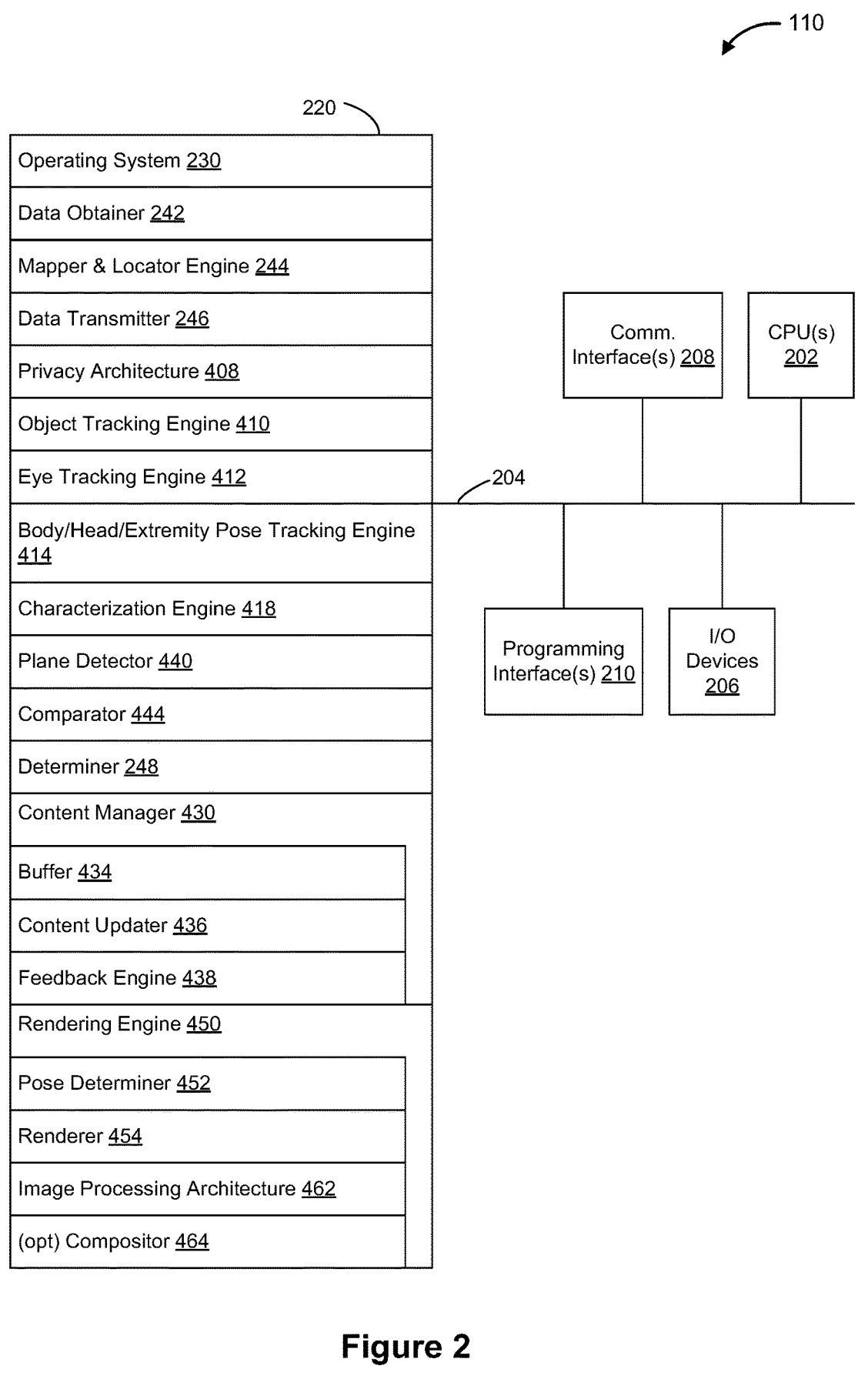

110

220

| Operating System 230 |
| --- |
| Data Obtainer 242 |
| Mapper & Locator Engine 244 |
| Data Transmitter 246 |
| Privacy Architecture 408 |
| Object Tracking Engine 410 |
| Eye Tracking Engine 412 |
| Body/Head/Extremity Pose Tracking Engine 414 |
| Characterization Engine 418 |
| Plane Detector 440 |
| Comparator 444 |
| Determiner 248 |
| Content Manager 430 |
| Buffer 434 |
| Content Updater 436 |
| Feedback Engine 438 |
| Rendering Engine 450 |
| Pose Determiner 452 |
| Renderer 454 |
| Image Processing Architecture 462 |
| (opt) Compositor 464 |

Comm. Interface(s) 208

CPU(s) 202

204

Programming Interface(s) 210

I/O Devices 206

Operating System 330

Presentation Engine 340

Data Obtainer 342

Interaction Handler 420

Presenter 470

Data Transmitter 350

CPU(s) 302

Comm. Interface(s) 308

Display(s) 312

304

I/O Devices & Sensors 306

Programming Interface(s) 310

Image Capture Device 370

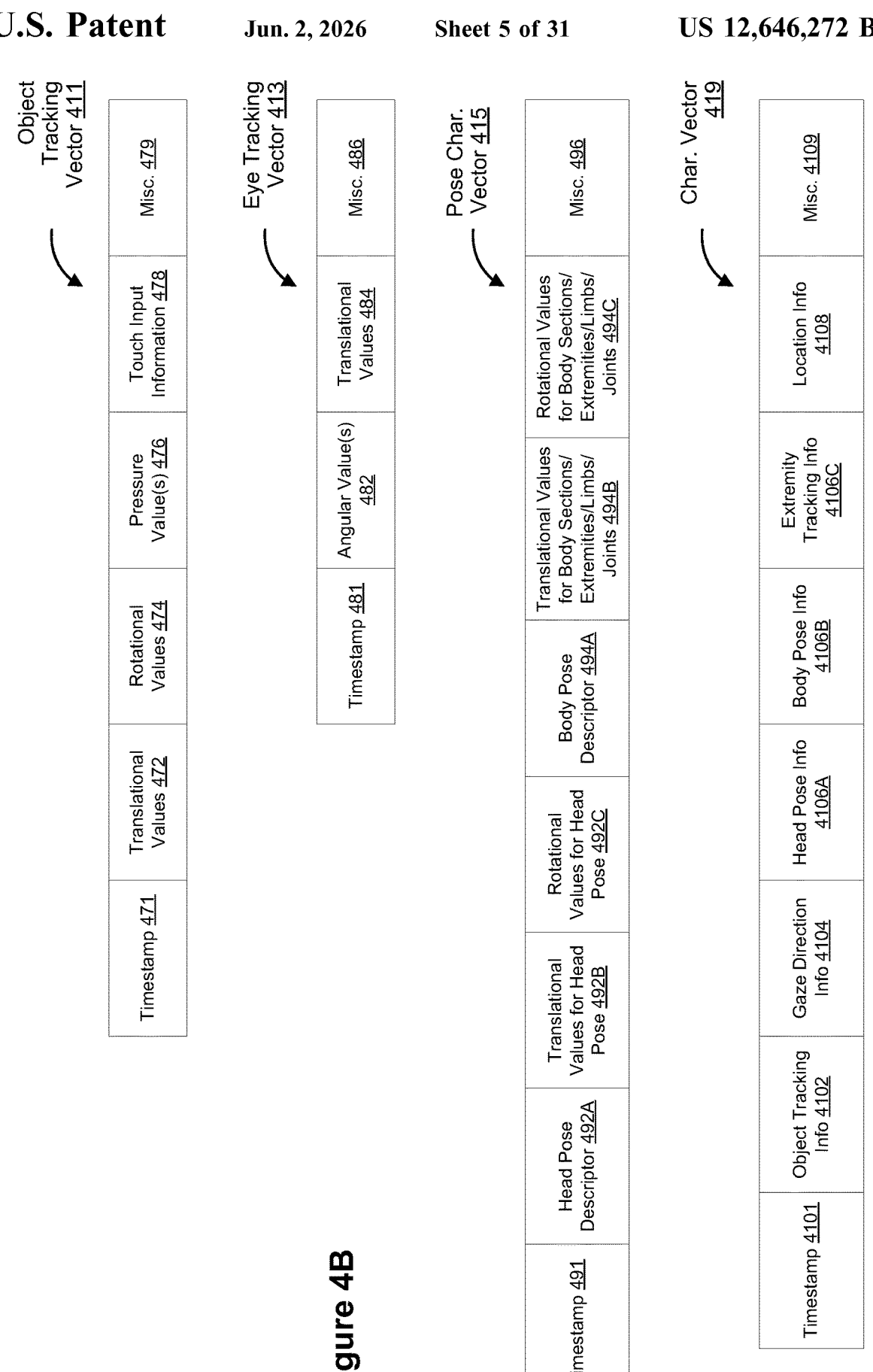

Object Tracking Vector 411

| Timestamp 471 | Translational Values 472 | Rotational Values 474 | Pressure Value(s) 476 | Touch Input Information 478 | Misc. 479 |

Eye Tracking Vector 413

| Timestamp 481 | Angular Value(s) 482 | Translational Values 484 | Misc. 486 |

Pose Char. Vector 415

| Timestamp 491 | Head Pose Descriptor 492A | Translational Values for Head Pose 492B | Rotational Values for Head Pose 492C | Body Pose Descriptor 494A | Translational Values for Body Sections/ Extremities/Limbs/ Joints 494B | Rotational Values for Body Sections/ Extremities/Limbs/ Joints 494C | Misc. 496 |

Char. Vector 419

| Timestamp 4101 | Object Tracking Info 4102 | Gaze Direction Info 4104 | Head Pose Info 4106A | Body Pose Info 4106B | Extremity Tracking Info 4106C | Location Info 4108 | Misc. 4109 |

510

560

5100

5140

5170

5180

600

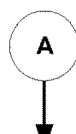

After presenting the XR surface, detect a speech input; and                    618
In response to detecting the speech input:
      Generate text based on the speech input; and
      Present the text on the XR surface Expand the XR surface in at least one spatial dimension as the text
is presented on the XR surface in accordance with a determination           620
that a character count of the text causes the text to exceed at least
the one spatial dimension of the XR surface

Detect a manipulation input directed to moving the XR surface;          622
and
      In response to detecting the manipulation input, modify the XR
surface by at least one of translating the XR surface or rotating the XR
surface in one or more dimensions

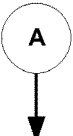

Detect a second physical plane within the image stream of the          624
physical environment; and
      In response to detecting the second physical plane within the
image stream:
            Determine pose values for the second physical plane; and
            Present a second XR surface provided to present marks at
a second location, wherein the second location is based on the pose
values for the second physical plane

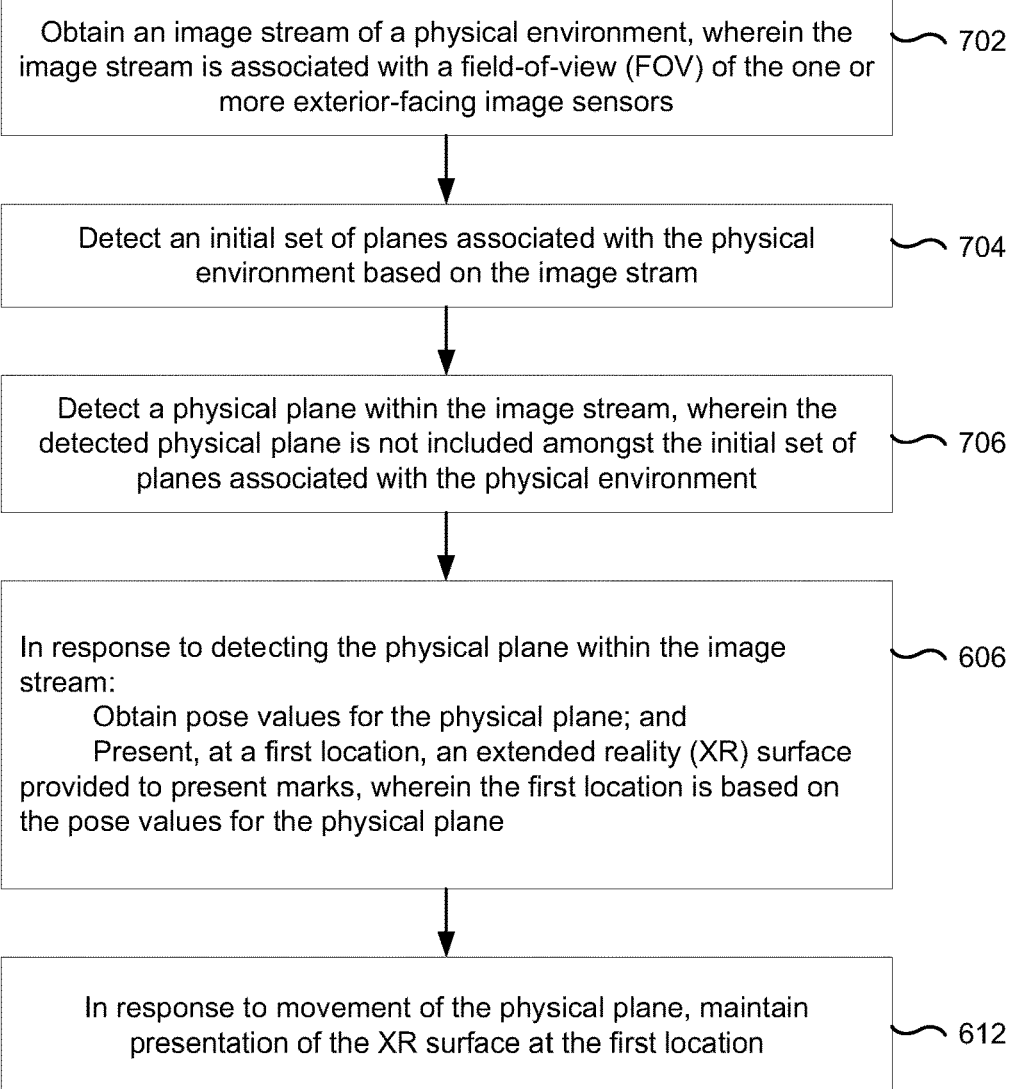

Obtain an image stream of a physical environment, wherein the image stream is associated with a field-of-view (FOV) of the one or more exterior-facing image sensors    702

Detect an initial set of planes associated with the physical environment based on the image stram    704

Detect a physical plane within the image stream, wherein the detected physical plane is not included amongst the initial set of planes associated with the physical environment    706

In response to detecting the physical plane within the image stream:
    Obtain pose values for the physical plane; and
    Present, at a first location, an extended reality (XR) surface provided to present marks, wherein the first location is based on the pose values for the physical plane    606

In response to movement of the physical plane, maintain presentation of the XR surface at the first location    612

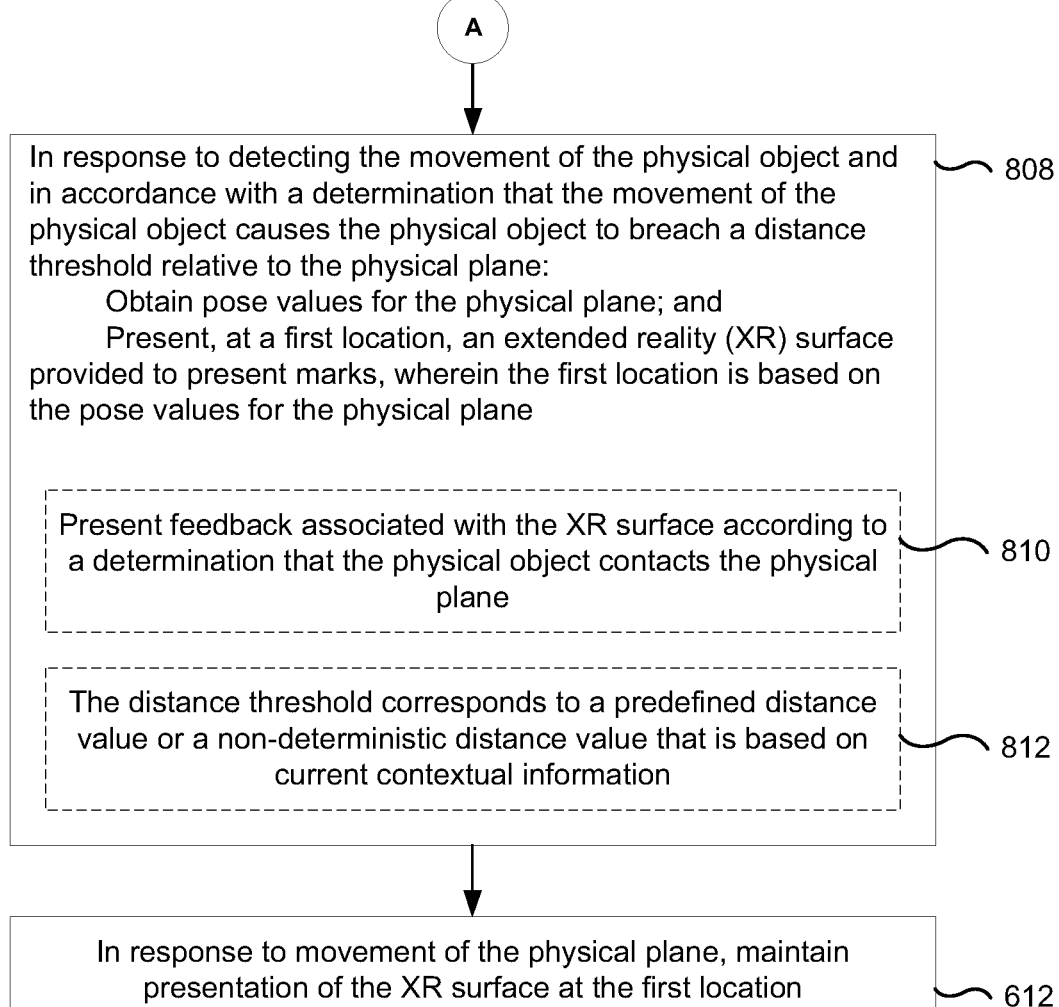

In response to detecting the movement of the physical object and in accordance with a determination that the movement of the physical object causes the physical object to breach a distance threshold relative to the physical plane:
  Obtain pose values for the physical plane; and
  Present, at a first location, an extended reality (XR) surface provided to present marks, wherein the first location is based on the pose values for the physical plane — 808

Present feedback associated with the XR surface according to a determination that the physical object contacts the physical plane — 810

The distance threshold corresponds to a predefined distance value or a non-deterministic distance value that is based on current contextual information — 812

In response to movement of the physical plane, maintain presentation of the XR surface at the first location — 612

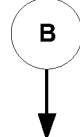

In response to detecting the movement of the physical object and in accordance with a determination that the movement of the physical object does not cause the physical object to breach the distance threshold relative to the physical plane:
  Forgo presentation of the XR surface — 814

Figure 8B

METHOD AND DEVICE FOR INVOKING A WRITING SURFACE

TECHNICAL FIELD

The present disclosure generally relates to interacting with a user interface and, in particular, to systems, devices, and methods for invoking a writing surface.

BACKGROUND

A user may invoke a note or a blank text entry document by launching an appropriate application. However, the application launch process may include several steps that could distract a user from their workflow.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 2 is a block diagram of an example controller in accordance with some implementations.

FIG. 4B illustrates example data structures in accordance with some implementations.

FIGS. 6A and 6B illustrate a flowchart representation of a method of invoking an XR surface in accordance with some implementations.

FIG. 7 illustrates a flowchart representation of a method of invoking an XR surface in response to detecting a physical plane added to a physical environment in accordance with some implementations.

FIGS. 8A and 8B illustrate a flowchart representation of a method of invoking an XR surface in response to detecting a physical plane added to a physical environment and in accordance with a determination that a proximity condition is satisfied in accordance with some implementations.

Figure 1:
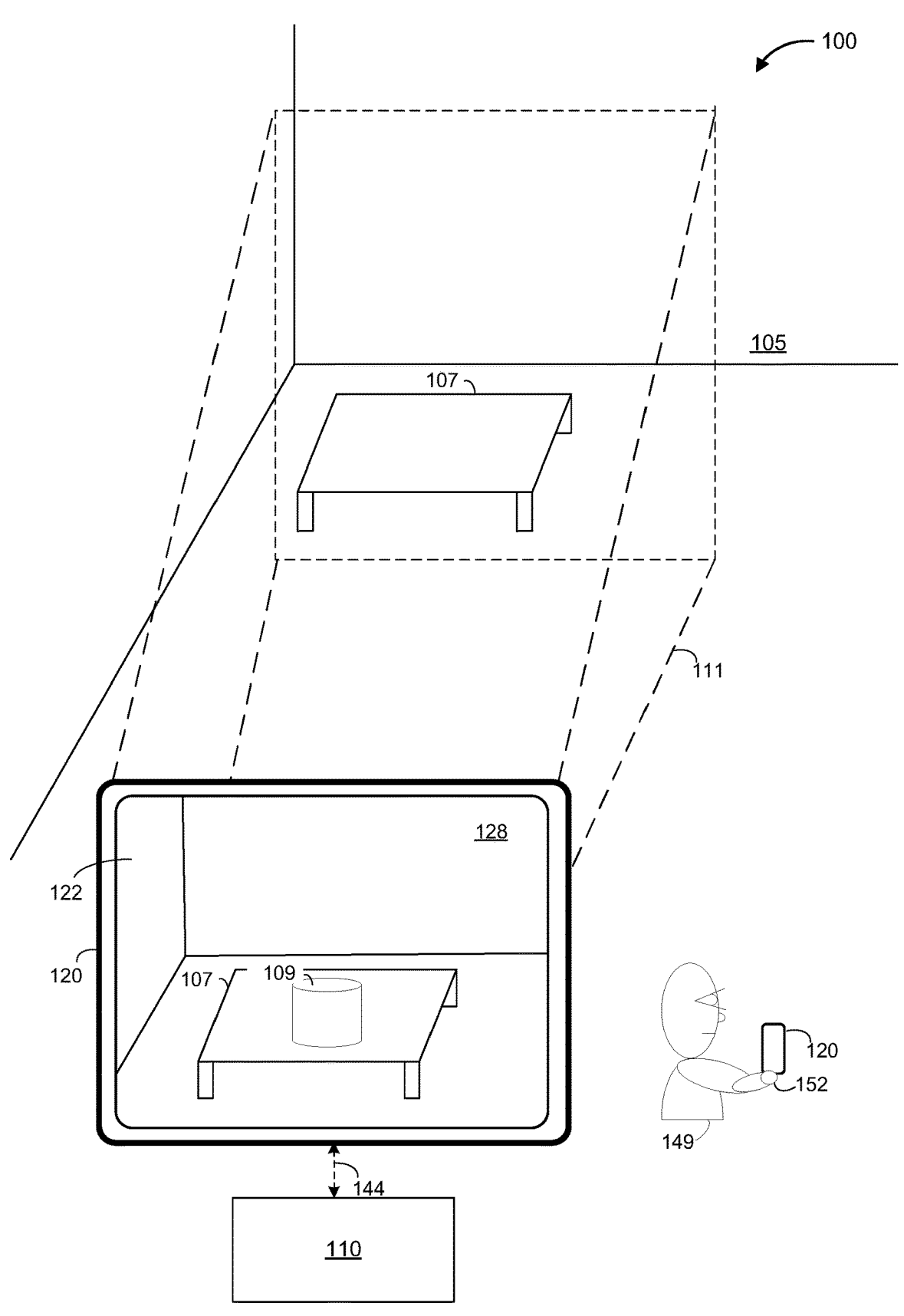
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for invoking a writing surface. According to some implementations, the method is performed at a computing system including non-transitory memory and one or more processors, wherein the computing system is communicatively coupled to a display device, one or more exterior-facing image sensors, and one or more input devices. The method includes: detecting a physical plane within an image stream of a physical environment, wherein the image stream is associated with a field-of-view (FOV) of the one or more exterior-facing image sensors; in response to detecting the physical plane within the image stream: obtaining pose values for the physical plane; and presenting, at a first location, an extended reality (XR) surface provided to display marks, wherein the first location is based on the pose values for the physical plane; and in response to movement of the physical plane, maintaining presentation of the XR surface at the first location.

In accordance with some implementations, an electronic device includes one or more displays, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more displays, one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

The described technology may gather and use information from various sources. This information may, in some instances, include personal information that identifies or may be used to locate or contact a specific individual. This personal information may include demographic data, location data, telephone numbers, email addresses, date of birth, social media account names, work or home addresses, data or records associated with a user's health or fitness level, or other personal or identifying information.

The collection, storage, transfer, disclosure, analysis, or other use of personal information should comply with well-established privacy policies or practices. Privacy policies and practices that are generally recognized as meeting or exceeding industry or governmental requirements should be implemented and used. Personal information should be collected for legitimate and reasonable uses and not shared or sold outside of those uses. The collection or sharing of information should occur after receipt of the user's informed consent.

It is contemplated that, in some instances, users may selectively prevent the use of, or access to, personal information. Hardware or software features may be provided to prevent or block access to personal information. Personal information should be handled to reduce the risk of unintentional or unauthorized access or use. Risk can be reduced by limiting the collection of data and deleting the data once it is no longer needed. When applicable, data de-identification may be used to protect a user's privacy.

Although the described technology may broadly include the use of personal information, it may be implemented without accessing such personal information. In other words, the present technology may not be rendered inoperable due to the lack of some or all of such personal information.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120.

In some implementations, the controller 110 is configured to manage and coordinate an extended reality (XR) experience (sometimes also referred to herein as a "XR environment" or a "virtual environment" or a "graphical environment") for a user 149 and optionally other users. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video (A/V) content to the user 149. In some implementations, the electronic device 120 is configured to present a user interface (UI) and/or an XR environment 128 to the user 149. In some implementations, the electronic device 120 includes a suitable combination of software, firmware, and/or hardware. The electronic device 120 is described in greater detail below with respect to FIG. 3. The XR environment may refer to a partially or wholly simulated environment that people may sense or interact with using the electronic device 120. The XR environment may include virtual reality (VR) content, mixed reality (MR) content, augmented reality (AR) content, or the like.

According to some implementations, the electronic device 120 presents an XR experience to the user 149 while the user 149 is physically present within a physical environment 105 that includes a table 107 within the field-of-view (FOV) 111 of the electronic device 120. As such, in some implementations, the user 149 holds the electronic device 120 in their right hand 152 as shown in FIG. 1. In some implementations, while presenting the XR experience, the electronic device 120 is configured to present XR content (sometimes also referred to herein as "graphical content" or "virtual content"), including an XR cylinder 109, and to enable video pass-through of the physical environment 105 (e.g., including the table 107 or a representation thereof) on a display 122. For example, the XR environment 128, including the XR cylinder 109, is volumetric or three-dimensional (3D).

In one example, the XR cylinder 109 corresponds to head/display-locked content such that the XR cylinder 109 remains presented at the same location on the display 122 as the FOV 111 changes due to translational and/or rotational movement of the electronic device 120. As another example, the XR cylinder 109 corresponds to world/object-locked content such that the XR cylinder 109 remains presented at its origin location as the FOV 111 changes due to translational and/or rotational movement of the electronic device 120. As such, in this example, if the FOV 111 does not include the origin location, the XR environment 128 will not include the XR cylinder 109. For example, the electronic device 120 corresponds to a near-eye system, mobile phone, tablet, laptop, wearable computing device, or the like.

In some implementations, the display 122 corresponds to an additive display that enables optical see-through of the physical environment 105 including the table 107. For example, the display 122 corresponds to a transparent lens, and the electronic device 120 corresponds to a pair of glasses worn by the user 149. As such, in some implementations, the electronic device 120 presents a user interface by projecting the XR content (e.g., the XR cylinder 109) onto the additive display, which is, in turn, overlaid on the physical environment 105 from the perspective of the user 149. In some implementations, the electronic device 120 presents the user interface by presenting the XR content (e.g., the XR cylinder 109) on the additive display, which is, in turn, overlaid on the physical environment 105 from the perspective of the user 149.

In some implementations, the user 149 wears the electronic device 120 such as a near-eye system. As such, the electronic device 120 includes one or more displays provided to display the XR content (e.g., a single display or one for each eye). For example, the electronic device 120 encloses the FOV of the user 149. In such implementations, the electronic device 120 presents the XR environment 128 by presenting data corresponding to the XR environment 128 on the one or more displays or by projecting data corresponding to the XR environment 128 onto the retinas of the user 149.

In some implementations, the electronic device 120 includes an integrated display (e.g., a built-in display) that presents the XR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment 128. In some implementations, the electronic device 120 is replaced with an XR chamber, enclosure, or room configured to present XR content in which the user 149 does not wear the electronic device 120.

In some implementations, the controller 110 and/or the electronic device 120 cause an XR representation of the user 149 to move within the XR environment 128 based on movement information (e.g., body pose data, eye tracking data, hand/limb/finger/extremity tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 149 is physically within the physical environment 105. In some implementations, the remote input devices include microphones, and the input data includes audio data associated with the user 149 (e.g., speech samples). In some implementations, the remote input devices include image sensors (e.g., cameras), and the input data includes images of the user 149. In some implementations, the input data characterizes body poses of the user 149 at different times. In some implementations, the input data characterizes head poses of the user 149 at different times. In some implementations, the input data characterizes hand tracking information associated with the hands of the user 149 at different times. In some implementations, the input data characterizes the velocity and/or acceleration of body parts of the user 149 such as their hands. In some implementations, the input data indicates joint positions and/or joint orientations of the user 149. In some implementations, the remote input devices include feedback devices such as speakers, lights, or the like.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a touchscreen, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof described below with respect to FIG. 2.

The operating system 230 includes procedures for handling various basic system services and for performing hardware dependent tasks.

In some implementations, a data obtainer 242 is configured to obtain data (e.g., captured image frames of the physical environment 105, presentation data, input data, user interaction data, camera pose tracking information, eye tracking information, head/body pose tracking information, hand/limb/finger/extremity tracking information, sensor data, location data, etc.) from at least one of the I/O devices 206 of the controller 110, the I/O devices and sensors 306 of the electronic device 120, and the optional remote input devices. To that end, in various implementations, the data obtainer 242 includes instructions and/or logic therefor, and heuristics and metadata therefor.

In some implementations, a mapper and locator engine 244 is configured to map the physical environment 105 and to track the position/location of at least the electronic device 120 or the user 149 with respect to the physical environment 105. To that end, in various implementations, the mapper and locator engine 244 includes instructions and/or logic therefor, and heuristics and metadata therefor.

In some implementations, a data transmitter 246 is configured to transmit data (e.g., presentation data such as rendered image frames associated with the XR environment, camera pose tracking information, eye tracking information, head/body pose tracking information, hand/limb/finger/extremity tracking information, location data, etc.) to at least the electronic device 120 and optionally one or more other devices. To that end, in various implementations, the data transmitter 246 includes instructions and/or logic therefor, and heuristics and metadata therefor.

In some implementations, a privacy architecture 408 is configured to ingest data and filter user information and/or identifying information within the data based on one or more privacy filters. The privacy architecture 408 is described in more detail below with reference to FIG. 4A. To that end, in various implementations, the privacy architecture 408 includes instructions and/or logic therefor, and heuristics and metadata therefor.

Figure 4A:
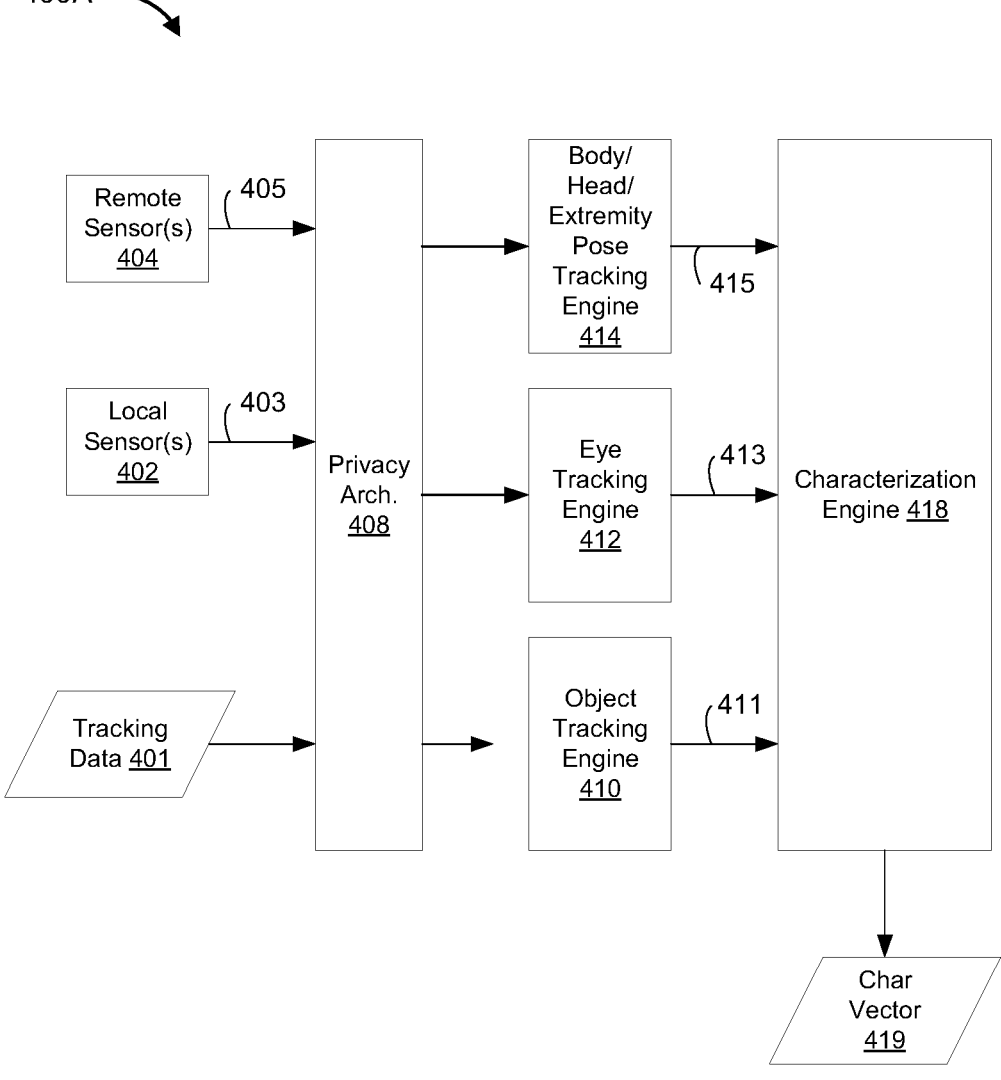
FIG. 4A is a block diagram of a first portion of an example content delivery architecture in accordance with some implementations.

In some implementations, an object tracking engine 410 is configured to obtain (e.g., receive, retrieve, or determine/generate) an object tracking vector 411 associated with one or more physical objects being tracked within the physical environment 105 (e.g., the control device 552 in FIGS. 5E and 5R, the pad of paper 572 in FIGS. 5G, 5H, and 5L-5Q, the physical proxy object 5132 in FIGS. 5M-5Q, and/or the like) based on input data and update the object tracking vector 411 overtime. For example, as shown in FIG. 4B, the object tracking vector 411 includes translational values 472 for the one or more physical objects (e.g., associated with x, y, and z coordinates relative to the physical environment 105 or the world-at-large), rotational values 474 for the one or more physical objects (e.g., roll, pitch, and yaw), one or more pressure values 476 associated with the one or more physical objects, optional touch input information 478 associated with the one or more physical objects, and/or the like. The object tracking engine 410 is described in more detail below with reference to FIG. 4A. To that end, in various implementations, the object tracking engine 410 is includes instructions and/or logic therefor, and heuristics and metadata therefor.

In some implementations, an eye tracking engine 412 is configured to obtain (e.g., receive, retrieve, or determine/generate) an eye tracking vector 413 as shown in FIG. 4B (e.g., with a gaze direction) based on the input data and update the eye tracking vector 413 over time. For example, the gaze direction indicates a point (e.g., associated with x, y, and z coordinates relative to the physical environment 105 or the world-at-large), a physical object, or a region of interest (ROI) in the physical environment 105 at which the user 149 is currently looking. As another example, the gaze direction indicates a point (e.g., associated with x, y, and z coordinates relative to the XR environment 128), an XR object, or a region of interest (ROI) in the XR environment 128 at which the user 149 is currently looking. The eye tracking engine 412 is described in more detail below with reference to FIG. 4A. To that end, in various implementations, the eye tracking engine 412 includes instructions and/or logic therefor, and heuristics and metadata therefor.

In some implementations, a body/head/extremity pose tracking engine 414 is configured to obtain (e.g., receive, retrieve, or determine/generate) a pose characterization vector 415 based on the input data and update the pose characterization vector 415 over time. For example, as shown in FIG. 4B, the pose characterization vector 415 includes ahead pose descriptor 492A (e.g., upward, downward, neutral, etc.), translational values 492B for the head pose, rotational values 492C for the head pose, a body pose descriptor 494A (e.g., standing, sitting, prone, etc.), translational values 494B for body sections/extremities/limbs/joints, rotational values 494C for the body sections/extremities/limbs/joints, and/or the like. The body/head/extremity pose tracking engine 414 is described in more detail below with reference to FIG. 4A. To that end, in various implementations, the body/head/extremity pose tracking engine 414 includes instructions and/or logic therefor, and heuristics and metadata therefor.

In some implementations, the motion state estimator 410, the eye tracking engine 412, and the body/head/extremity pose tracking engine 414 may be located on the electronic device 120 in addition to or in place of the controller 110.

In some implementations, the characterization engine 418 is configured to determine/generate a characterization vector 419 based on at least one of the object tracking vector 411, the eye tracking vector 413, and the pose characterization vector 415 as shown in FIG. 4A. In some implementations, the characterization engine 418 is also configured to update the pose characterization vector 419 over time. As shown in FIG. 4B, the characterization vector 419 includes objecting tracking information 4102, gaze direction information 4104, head pose information 4106A, body pose information 4106B, extremity tracking information 4106C, location information 4108, and/or the like. The characterization engine 418 is described in more detail below with reference to FIG. 4A. To that end, in various implementations, the characterization engine 442 includes instructions and/or logic therefor, and heuristics and metadata therefor.

In some implementations, a plane detector 440 is configured to detect/identify a set of planes (and the bounds thereof) within an image stream 435 of the physical environment 105. In some implementations, the plane detector 440 is configured to continuously update the set of planes associated with the physical environment 105. The plane detector 440 is described in more detail below with reference to FIG. 4A. To that end, in various implementations, the plane detector 440 includes instructions and/or logic therefor, and heuristics and metadata therefor.

In some implementations, a comparator 444 is configured to compare an initial set of planes detected within the physical environment 105 to a current set of planes detected within the physical environment 105. In some implementations, the comparator 444 is also configured to provide an indicator when the current set of planes includes one or more planes that were not included in the initial set of planes. The comparator 444 is described in more detail below with reference to FIG. 4A. To that end, in various implementations, the comparator 444 includes instructions and/or logic therefor, and heuristics and metadata therefor.

In some implementations, a determiner 248 is configured to determine whether the plane detector 440 is operating in an initialization mode. In some implementations, the determiner 248 is also configured to determine whether the comparator 444 has provided the indicator denoting the detection/identification of the one or more planes that were not included in the initial set of planes. The plane determiner 248 is described in more detail below with reference to FIG. 4A. To that end, in various implementations, the determiner 248 includes instructions and/or logic therefor, and heuristics and metadata therefor.

In some implementations, a content manager 430 is configured to manage and update the layout, setup, structure, and/or the like for the XR environment 128 including one or more of VA(s), XR content, one or more user interface (UI) elements associated with the XR content, and/or the like. The content manager 430 is described in more detail below with reference to FIG. 4C. To that end, in various implementations, the content manager 430 includes instructions and/or logic therefor, and heuristics and metadata therefor. In some implementations, the content manager 430 includes a buffer 434, a content updater 436, and a feedback engine 438. In some implementations, the buffer 434 includes XR content, previous frames from the image stream 435, a rendered image frame, information associated with the initial set of planes, information associated with the current set of planes, and/or the like for one or more past instances and/or frames.

In some implementations, the content updater 436 is configured to modify the XR environment 128 over time based on translational or rotational movement of the electronic device 120 or physical objects within the physical environment 105, user inputs (e.g., a change in context, hand/extremity tracking inputs, eye tracking inputs, touch inputs, voice commands, modification/manipulation inputs with the physical object, marking inputs, other interaction inputs directed to the XR environment 128 or the user interface, and/or the like), and/or the like. To that end, in various implementations, the content updater 436 includes instructions and/or logic therefor, and heuristics and metadata therefor.

In some implementations, the feedback engine 438 is configured to generate sensory feedback (e.g., visual feedback such as text or lighting changes, audio feedback, haptic feedback, etc.) associated with the XR environment 128. To that end, in various implementations, the feedback engine 438 includes instructions and/or logic therefor, and heuristics and metadata therefor.

In some implementations, a rendering engine 450 is configured to render an XR environment 128 (sometimes also referred to herein as a "graphical environment" or "virtual environment") or image frame associated therewith as well as the VA(s), XR content, one or more UI elements associated with the XR content, and/or the like. To that end, in various implementations, the rendering engine 450 includes instructions and/or logic therefor, and heuristics and metadata therefor. In some implementations, the rendering engine 450 includes a pose determiner 452, a renderer 454, an optional image processing architecture 462, and an optional compositor 464. One of ordinary skill in the art will appreciate that the optional image processing architecture 462 and the optional compositor 464 may be present for video pass-through configurations but may be removed for fully VR or optical see-through configurations.

In some implementations, the pose determiner 452 is configured to determine a current camera pose of the electronic device 120 and/or the user 149 relative to the A/V content and/or XR content. The pose determiner 452 is described in more detail below with reference to FIG. 4A. To that end, in various implementations, the pose determiner 452 includes instructions and/or logic therefor, and heuristics and metadata therefor.

In some implementations, the renderer 454 is configured to render the A/V content and/or the XR content according to the current camera pose relative thereto. The renderer 454 is described in more detail below with reference to FIG. 4A. To that end, in various implementations, the renderer 454 includes instructions and/or logic therefor, and heuristics and metadata therefor.

In some implementations, the image processing architecture 462 is configured to obtain (e.g., receive, retrieve, or capture) an image stream 435 (as shown in FIG. 4A) including one or more images of the physical environment 105 from the current camera pose of the electronic device 120 and/or the user 149. In some implementations, the image processing architecture 462 is also configured to perform one or more image processing operations on the image stream 435 such as warping, color correction, gamma correction, sharpening, noise reduction, white balance, and/or the like. The image processing architecture 462 is described in more detail below with reference to FIG. 4A. To that end, in various implementations, the image processing architecture 462 includes instructions and/or logic therefor, and heuristics and metadata therefor.

In some implementations, the compositor 464 is configured to composite the rendered A/V content and/or XR content with the processed image stream of the physical environment 105 from the image processing architecture 462 to produce rendered image frames of the XR environment 128 for presentation. The compositor 464 is described in more detail below with reference to FIG. 4A. To that end, in various implementations, the compositor 464 includes instructions and/or logic therefor, and heuristics and metadata therefor.

Although the data obtainer 242, the mapper and locator engine 244, the data transmitter 246, the privacy architecture 408, the object tracking engine 410, the eye tracking engine 412, the body/head/extremity pose tracking engine 414, the characterization engine 418, the plane detector 440, the comparator 444, the determiner 248, the content manager 430, and the rendering engine 450 are shown as residing on a single device (e.g., the controller 110), it should be understood that in other implementations, any combination of the data obtainer 242, the mapper and locator engine 244, the data transmitter 246, the privacy architecture 408, the object tracking engine 410, the eye tracking engine 412, the body/head/extremity pose tracking engine 414, the characterization engine 418, the plane detector 440, the comparator 444, the determiner 248, the content manager 430, and the rendering engine 450 may be located in separate computing devices.

In some implementations, the functions and/or components of the controller 110 are combined with or provided by the electronic device 120 shown below in FIG. 3. Moreover, FIG. 2 is intended more as a functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
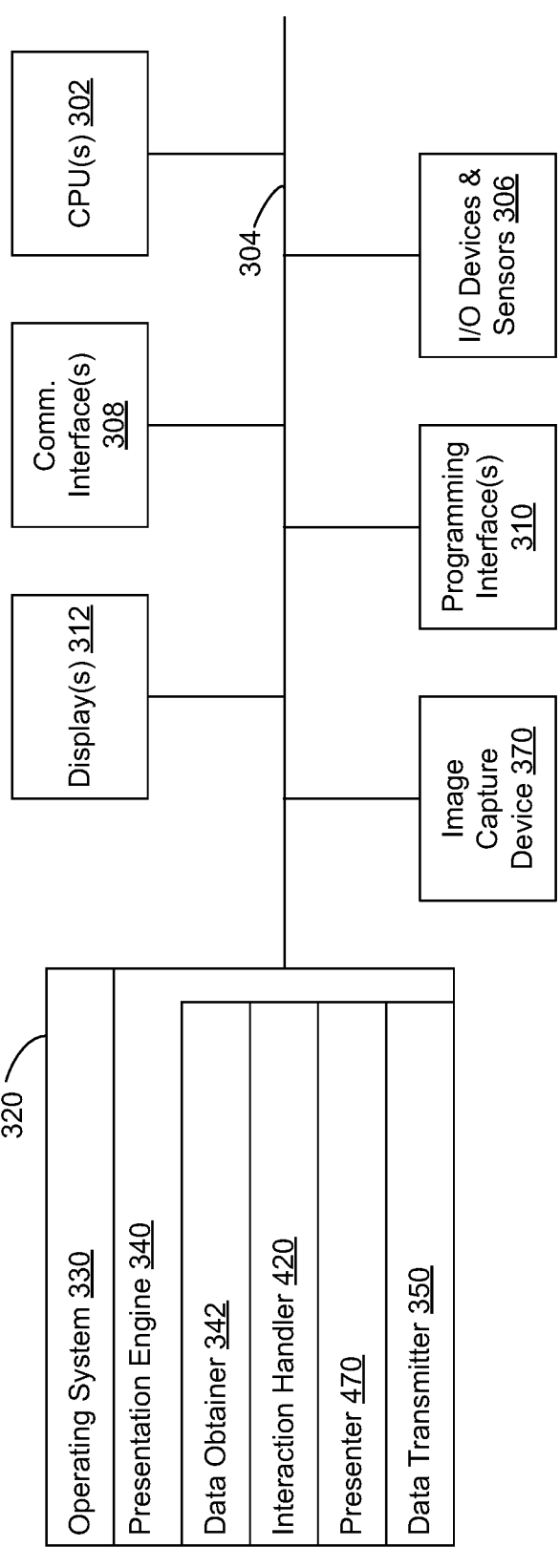
FIG. 3 is a block diagram of an example electronic device in accordance with some implementations.

FIG. 3 is a block diagram of an example of the electronic device 120 (e.g., a mobile phone, tablet, laptop, near-eye system, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, an image capture device 370 (e.g., one or more optional interior- and/or exterior-facing image sensors), a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oximetry monitor, blood glucose monitor, etc.), one or more microphones, one or more speakers, a haptics engine, a heating and/or cooling unit, a skin shear engine, one or more depth sensors (e.g., structured light, time-of-flight, LiDAR, or the like), a localization and mapping engine, an eye tracking engine, a body/head pose tracking engine, a hand/limb/finger/extremity tracking engine, a camera pose tracking engine, and/or the like.

In some implementations, the one or more displays 312 are configured to present the XR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the image capture device 370 correspond to one or more RGB cameras (e.g., with a complementary metal-oxide-semiconductor (CMOS) image sensor or a charge-coupled device (CCD) image sensor), IR image sensors, event-based cameras, and/or the like. In some implementations, the image capture device 370 includes a lens assembly, a photodiode, and a front-end architecture. In some implementations, the image capture device 370 includes exterior-facing and/or interior-facing image sensors.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a presentation engine 340.

The operating system 330 includes procedures for handling various basic system services and for performing hardware dependent tasks. In some implementations, the presentation engine 340 is configured to present media items and/or XR content to the user via the one or more displays 312. To that end, in various implementations, the presentation engine 340 includes a data obtainer 342, a presenter 470, an interaction handler 420, and a data transmitter 350.

In some implementations, the data obtainer 342 is configured to obtain data (e.g., presentation data such as rendered image frames associated with the user interface or the XR environment, input data, user interaction data, head tracking information, camera pose tracking information, eye tracking information, hand/limb/finger/extremity tracking information, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the interaction handler 420 is configured to detect user interactions directed to the presented A/V content and/or XR content (e.g., gestural inputs detected via hand/extremity tracking, eye gaze inputs detected via eye tracking, voice commands, touch inputs, etc.). To that end, in various implementations, the interaction handler 420 includes instructions and/or logic therefor, and heuristics and metadata therefor.

In some implementations, the presenter 470 is configured to present and update A/V content and/or XR content (e.g., the rendered image frames associated with the user interface or the XR environment 128 including the VA(s), the XR content, one or more UI elements associated with the XR content, and/or the like) via the one or more displays 312. To that end, in various implementations, the presenter 470 includes instructions and/or logic therefor, and heuristics and metadata therefor.

In some implementations, the data transmitter 350 is configured to transmit data (e.g., presentation data, location data, user interaction data, head tracking information, camera pose tracking information, eye tracking information, hand/limb/finger/extremity tracking information, etc.) to at least the controller 110. To that end, in various implementations, the data transmitter 350 includes instructions and/or logic therefor, and heuristics and metadata therefor.

Although the data obtainer 342, the interaction handler 420, the presenter 470, and the data transmitter 350 are shown as residing on a single device (e.g., the electronic device 120), it should be understood that in other implementations, any combination of the data obtainer 342, the interaction handler 420, the presenter 470, and the data transmitter 350 may be located in separate computing devices.

Moreover, FIG. 3 is intended more as a functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIG. 4A is a block diagram of a first portion 400A of an example content delivery architecture in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content delivery architecture is included in a computing system such as the controller 110 shown in FIGS. 1 and 2; the electronic device 120 shown in FIGS. 1 and 3; and/or a suitable combination thereof.

As shown in FIG. 4A, one or more local sensors 402 of the controller 110, the electronic device 120, and/or a combination thereof obtain local sensor data 403 associated with the physical environment 105. For example, the local sensor data 403 includes images or a stream thereof of the physical environment 105, simultaneous location and mapping (SLAM) information for the physical environment 105 and the location of the electronic device 120 or the user 149 relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the local sensor data 403 includes un-processed or post-processed information.

Similarly, as shown in FIG. 4A, one or more remote sensors 404 associated with the optional remote input devices within the physical environment 105 obtain remote sensor data 405 associated with the physical environment 105. For example, the remote sensor data 405 includes images or a stream thereof of the physical environment 105, SLAM information for the physical environment 105 and the location of the electronic device 120 or the user 149 relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the remote sensor data 405 includes un-processed or post-processed information.

As shown in FIG. 4A, tracking data 401 is obtained by at least one of the controller 110, the electronic device 120, or the like in order to localize and track one or more physical objects within the physical environment 105. As one example, the tracking data 401 includes images or a stream thereof of the physical environment 105 captured by exterior-facing image sensors of the electronic device 120 that includes the one or more physical objects. As another example, the tracking data 401 corresponds to IMU information, accelerometer information, gyroscope information, magnetometer information, and/or the like from integrated sensors of the one or more physical objects.

According to some implementations, the privacy architecture 408 ingests the local sensor data 403, the remote sensor data 405, and the tracking data 401. In some implementations, the privacy architecture 408 includes one or more privacy filters associated with user information and/or identifying information. In some implementations, the privacy architecture 408 includes an opt-in feature where the electronic device 120 informs the user 149 as to what user information and/or identifying information is being monitored and how the user information and/or the identifying information will be used. In some implementations, the privacy architecture 408 selectively prevents and/or limits the content delivery architecture 400A/400B or portions thereof from obtaining and/or transmitting the user information. To this end, the privacy architecture 408 receives user preferences and/or selections from the user 149 in response to prompting the user 149 for the same. In some implementations, the privacy architecture 408 prevents the content delivery architecture 400A/400B from obtaining and/or transmitting the user information unless and until the privacy architecture 408 obtains informed consent from the user 149. In some implementations, the privacy architecture 408 anonymizes (e.g., scrambles, obscures, encrypts, and/or the like) certain types of user information. For example, the privacy architecture 408 receives user inputs designating which types of user information the privacy architecture 408 anonymizes. As another example, the privacy architecture 408 anonymizes certain types of user information likely to include sensitive and/or identifying information, independent of user designation (e.g., automatically).

According to some implementations, the object tracking engine 410 obtains the tracking data 401 after it has been subjected to the privacy architecture 408. In some implementations, the object tracking engine 410 determines/ generates an object tracking vector 411 based on the tracking data 401 and updates the object tracking vector 411 over time.

FIG. 4B shows an example data structure for the object tracking vector 411 in accordance with some implementations. As shown in FIG. 4B, the object tracking vector 411 may correspond to an N-tuple characterization vector or characterization tensor that includes a timestamp 471 (e.g., the most recent time the object tracking vector 411 was updated), one or more translational values 472 for the one or more physical objects (e.g., x, y, and z values relative to the physical environment 105, the world-at-large, and/or the like), one or more rotational values 474 for the one or more physical objects (e.g., roll, pitch, and yaw values), one or more pressure values 476 associated with the one or more physical objects (e.g., a first pressure value associated with contact between an end of a respective physical object and a surface, a second pressure value associated with an amount of pressure exerted on a body of the respective physical object while grasped by the user 149, and/or the like), optional touch input information 478 (e.g., information associated with user touch inputs directed to the one or more physical objects), and/or miscellaneous information 479. One of ordinary skill in the art will appreciate that the data structure for the object tracking vector 411 in FIG. 5B is merely an example that may include different information portions in various other implementations and be structured in myriad ways in various other implementations.

According to some implementations, the eye tracking engine 412 obtains the local sensor data 403 and the remote sensor data 405 after it has been subjected to the privacy architecture 408. In some implementations, the eye tracking engine 412 obtains (e.g., receives, retrieves, or determines/ generates) an eye tracking vector 413 based on the input data and updates the eye tracking vector 413 over time.

FIG. 4B shows an example data structure for the eye tracking vector 413 in accordance with some implementations. As shown in FIG. 4B, the eye tracking vector 413 may correspond to an N-tuple characterization vector or characterization tensor that includes a timestamp 481 (e.g., the most recent time the eye tracking vector 413 was updated), one or more angular values 482 for a current gaze direction (e.g., roll, pitch, and yaw values), one or more translational values 484 for the current gaze direction (e.g., x, y, and z values relative to the physical environment 105, the world-at-large, and/or the like), and/or miscellaneous information 486. One of ordinary skill in the art will appreciate that the data structure for the eye tracking vector 413 in FIG. 4B is merely an example that may include different information portions in various other implementations and be structured in myriad ways in various other implementations.

For example, the gaze direction indicates a point (e.g., associated with x, y, and z coordinates relative to the physical environment 105 or the world-at-large), a physical object, or a region of interest (ROI) in the physical environment 105 at which the user 149 is currently looking. As another example, the gaze direction indicates a point (e.g., associated with x, y, and z coordinates relative to the XR environment 128), an XR object, or a region of interest (ROI) in the XR environment 128 at which the user 149 is currently looking.

According to some implementations, the body/head/extremity pose tracking engine 414 obtains the local sensor data 403 and the remote sensor data 405 after it has been subjected to the privacy architecture 408. In some implementations, the body/head/extremity pose tracking engine 414 obtains (e.g., receives, retrieves, or determines/generates) a pose characterization vector 415 based on the input data and updates the pose characterization vector 415 over time.

FIG. 4B shows an example data structure for the pose characterization vector 415 in accordance with some implementations. As shown in FIG. 4B, the pose characterization vector 415 may correspond to an N-tuple characterization vector or characterization tensor that includes a timestamp 491 (e.g., the most recent time the pose characterization vector 415 was updated), a head pose descriptor 492A (e.g., upward, downward, neutral, etc.), translational values for the head pose 492B, rotational values for the head pose 492C, a body pose descriptor 494A (e.g., standing, sitting, prone, etc.), translational values for body sections/extremities/limbs/joints 494B, rotational values for the body sections/extremities/limbs/joints 494C, and/or miscellaneous information 496. In some implementations, the pose characterization vector 415 also includes information associated with finger/hand/extremity tracking. One of ordinary skill in the art will appreciate that the data structure for the pose characterization vector 415 in FIG. 4B is merely an example that may include different information portions in various other implementations and be structured in myriad ways in various other implementations. According to some implementations, the motion state vector 411, the eye tracking vector 413 and the pose characterization vector 415 are collectively referred to as an input vector 419.

According to some implementations, the characterization engine 418 obtains the object tracking vector 411, the eye tracking vector 413, and the pose characterization vector 415. In some implementations, the characterization engine 418 obtains (e.g., receives, retrieves, or determines/generates) the characterization vector 419 based on the object tracking vector 411, the eye tracking vector 413, and the pose characterization vector 415.

FIG. 4B shows an example data structure for the characterization vector 419 in accordance with some implementations. As shown in FIG. 4B, the characterization vector 419 may correspond to an N-tuple characterization vector or characterization tensor that includes a timestamp 4101 (e.g., the most recent time the characterization vector 419 was updated), objecting tracking information 4102 (e.g., based on the translational values 472 and the rotational values 474 within the object tracking vector 411 for the one or more physical objects that are being tracked by the controller 110, the electronic device 120, and/or a combination thereof), gaze direction information 4104 (e.g., based on the one or more angular values 482 and the one or more translational values 484 within the eye tracking vector 413), head pose information 4106A (e.g., the head pose descriptor 492A), body pose information 4106B (e.g., based on the body pose descriptor 494A within the pose characterization vector 415), extremity tracking information 4106C (e.g., based on the body pose descriptor 494A within the pose characterization vector 415 that is associated with extremities of the user 149 that are being tracked by the controller 110, the electronic device 120, and/or a combination thereof), location information 4108 (e.g., a household location such as a kitchen or living room, a vehicular location such as an automobile, plane, etc., and/or the like), and/or miscellaneous information 4109.

Figure 4C:
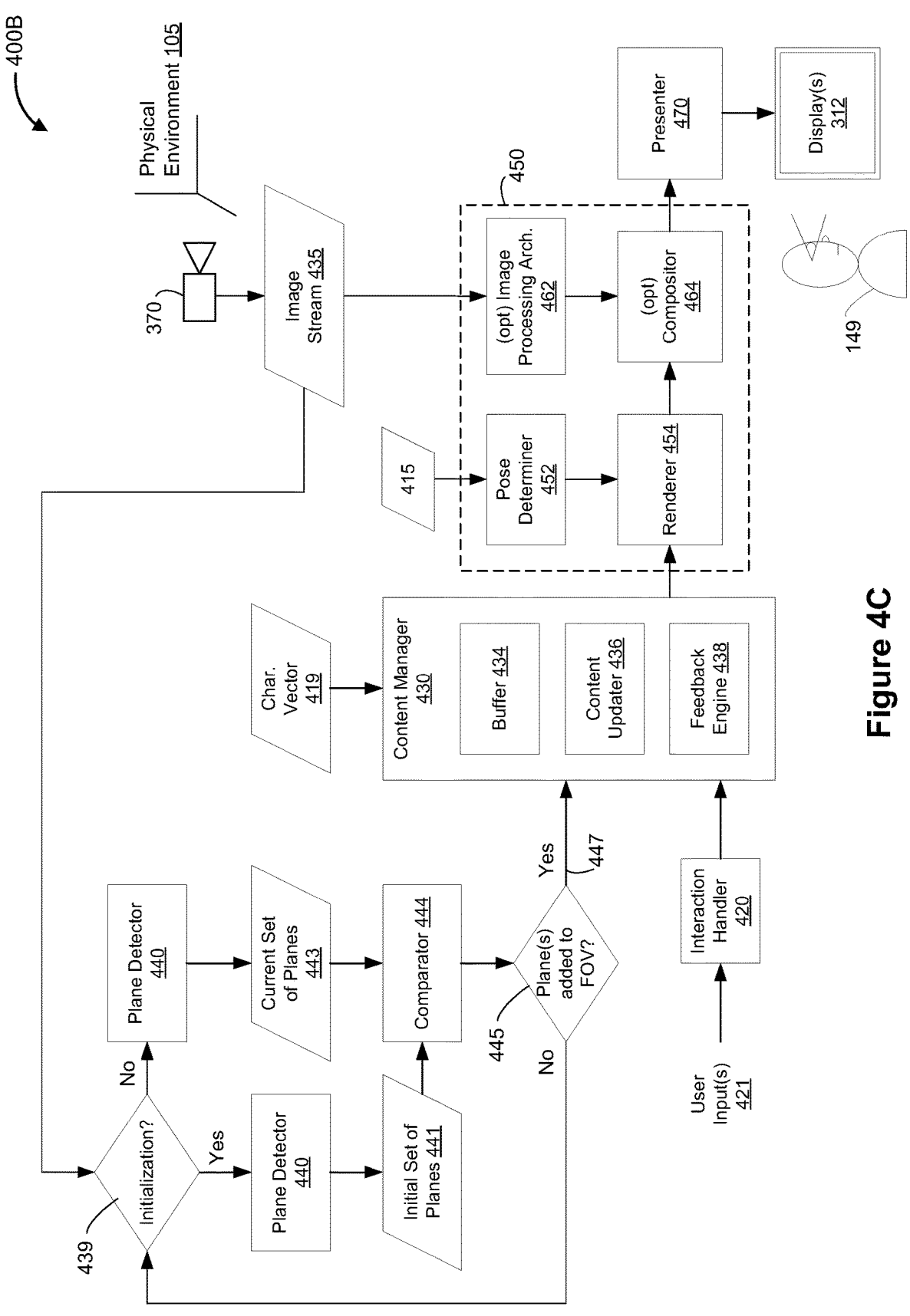
FIG. 4C is a block diagram of a second portion of the example content delivery architecture in accordance with some implementations.

FIG. 4C is a block diagram of a second portion 400B of the example content delivery architecture in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content delivery architecture is included in a computing system such as the controller 110 shown in FIGS. 1 and 2; the electronic device 120 shown in FIGS. 1 and 3; and/or a suitable combination thereof. FIG. 4C is similar to and adapted from FIG. 4A. Therefore, similar reference numbers are used in FIGS. 4A and 4C. As such, only the differences between FIGS. 4A and 4C will be described below for the sake of brevity.

In some implementations, the image capture device 370 captures, via one or more exterior-facing image sensors, an image stream 435 of the physical environment 105. In some implementations, the determiner 248 obtains the image stream 435 and determines (439) whether the plane detector 440 should operate in an initialization mode. For example, if the plane detector 440 has not detected/identified an initial set of planes for the physical environment, the determiner 248 determines that the plane detector 440 should operate in an initialization mode ("Yes" branch). Continuing with this example, if the plane detector 440 has detected/identified the initial set of planes for the physical environment, the determiner 248 determines that the plane detector 440 should not operate in the initialization mode ("No" branch).

In some implementations, the plane detector 440 detects/identifies an initial set of planes 441 within the physical environment in accordance with the determination that the plane detector 440 should operate in the initialization mode (e.g., associated with time T). In some implementations, the plane detector 440 detects/identifies a current set of planes 443 within the physical environment in accordance with the determination that the plane detector 440 should not operate in the initialization mode (e.g., associated with time T+1). For example, the initial set of planes 441 and the current set of planes 443 may include vertical planes, horizontal planes, angled planes, and/or the like.

In some implementations, the comparator 444 compares the initial set of planes 441 with the current set of planes 443 and outputs an indicator 447 when the current set of planes 443 includes one or more planes that were not included in the initial set of planes 441. In some implementations, the determiner 248 obtains the output from the comparator 444 and determines (445) whether the output includes the indicator 447. For example, if the output from the comparator 444 includes the indicator 447 ("Yes" branch), the determiner 248 provides the indicator 447 to the content manager 430. Continuing with this example, if the output from the comparator 444 does not include the indicator 447 ("No" branch), the determiner 248 loops back to the determination (439).

In some implementations, the interaction handler 420 obtains (e.g., receives, retrieves, or detects) one or more user inputs 421 provided by the user 149 that are associated with interacting with the A/V content, the XR environment 128, one or more VAs within the XR environment 128, and/or XR content within the XR environment 128. In some implementations, the interaction handler 420 obtains (e.g., receives, retrieves, or detects) one or more user inputs 421 provided by the user 149 that are associated with modifying or manipulating the XR content or VA(s) within the XR environment 128 (e.g., rotational and/or translational movements directed to the XR content or VA(s) within the XR environment 128). In some implementations, the interaction handler 420 obtains (e.g., receives, retrieves, or detects) one or more user inputs 421 provided by the user 149 that are associated with creating marks and/or content within the XR environment 128. For example, the one or more user inputs 421 correspond to a gestural input detected via hand/extremity tracking, an eye gaze input detected via eye tracking, a voice command detected via a microphone, and/or the like.

In some implementations, the content manager 430 manages and updates the layout, setup, structure, and/or the like for the XR environment 128, including one or more of VAs, XR content, one or more UI elements associated with the XR content, and/or the like, based on the characterization vector 419, the indication 447 of the one or more planes added to the physical environment 105, (optionally) the user inputs 421, and/or the like. To that end, the content manager 430 includes the frame buffer 434, the content updater 436, and the feedback engine 438.

In some implementations, the buffer 434 includes XR content, a rendered image frame, information associated with the initial set of planes 441, information associated with the current set of planes 443, and/or the like for one or more past instances and/or frames. In some implementations, the content updater 436 modifies the XR environment 128 over time based on the characterization vector 419, the user inputs 421 associated with modifying and/or manipulating the XR content or VA(s) within the XR environment 128, translational or rotational movement of objects within the physical environment 105, translational or rotational movement of the electronic device 120 (or the user 149), and/or the like. In some implementations, the feedback engine 438 generates sensory feedback (e.g., visual feedback such as text or lighting changes, audio feedback, haptic feedback, etc.) associated with the XR environment 128.

According to some implementations, the pose determiner 452 determines a current camera pose of the electronic device 120 and/or the user 149 relative to the XR environment 128 and/or the physical environment 105 based at least in part on the pose characterization vector 415. In some implementations, the renderer 454 renders the VA(s), the XR content 427, one or more UI elements associated with the XR content, and/or the like according to the current camera pose relative thereto.

According to some implementations, the optional image processing architecture 462 obtains the image stream 435 from an image capture device 370 including one or more images of the physical environment 105 from the current camera pose of the electronic device 120 and/or the user 149. In some implementations, the image processing architecture 462 also performs one or more image processing operations on the image stream 435 such as warping, color correction, gamma correction, sharpening, noise reduction, white balance, and/or the like. In some implementations, the optional compositor 464 composites the rendered XR content with the processed image stream of the physical environment 105 from the image processing architecture 462 to produce rendered image frames of the XR environment 128. In various implementations, the presenter 470 presents the rendered image frames of the XR environment 128 to the user 149 via the one or more displays 312. One of ordinary skill in the art will appreciate that the optional image processing architecture 462 and the optional compositor 464 may not be applicable for fully virtual environments (or optical see-through scenarios).

Figure 5A:
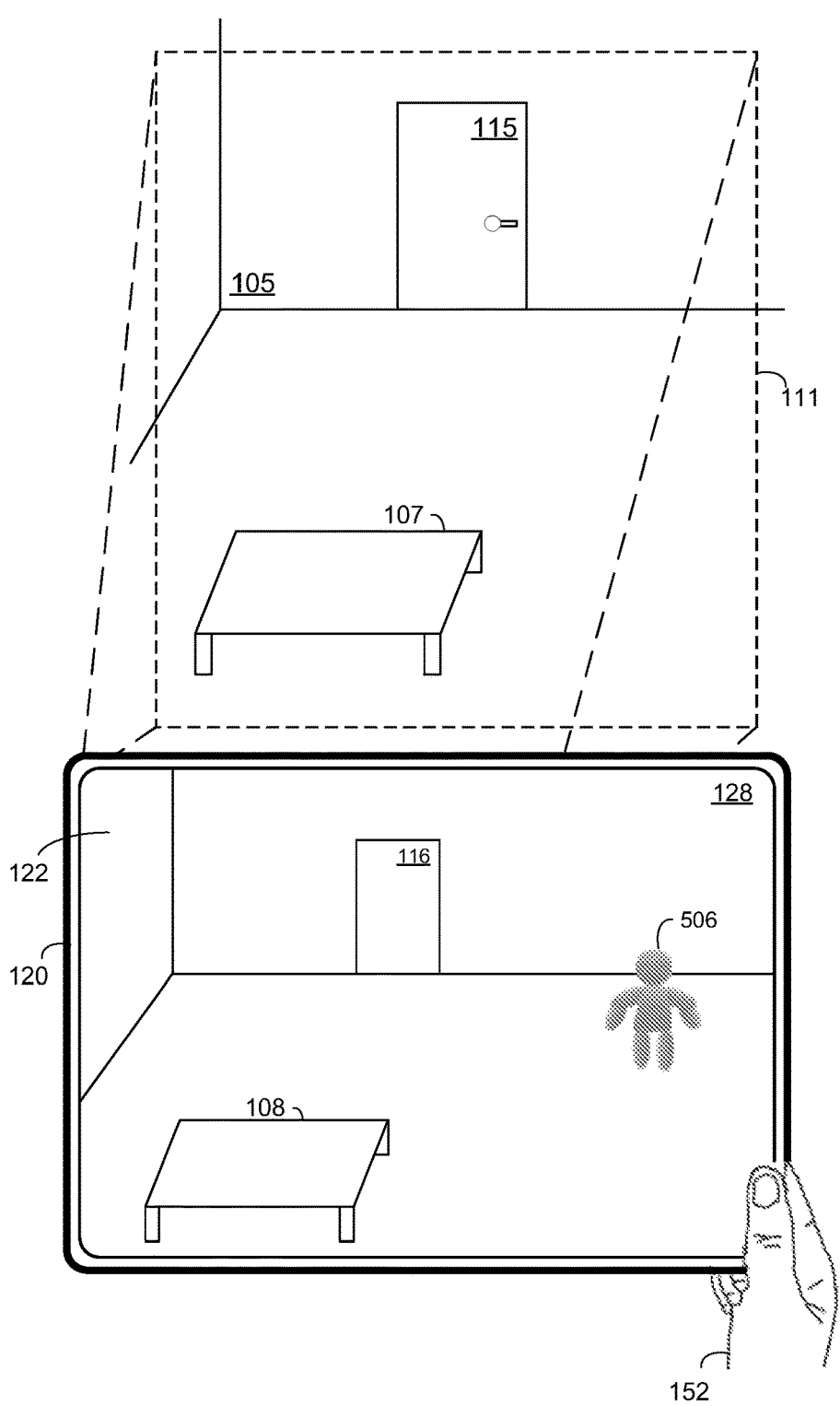
FIGS. 5A-5T illustrate a sequence of instances for a content delivery scenario in accordance with some implementations.
Figure 5B:
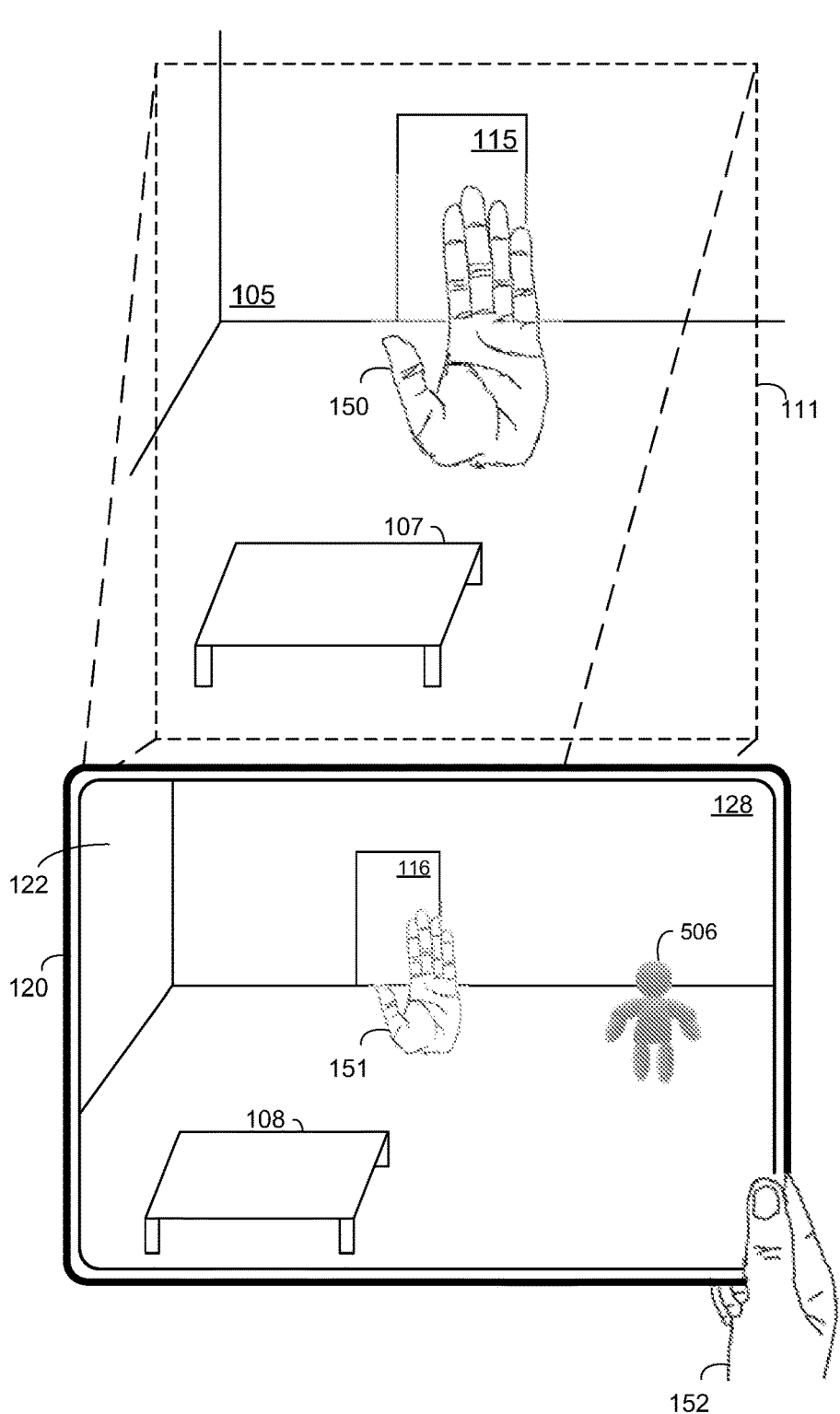
Figure 5C:
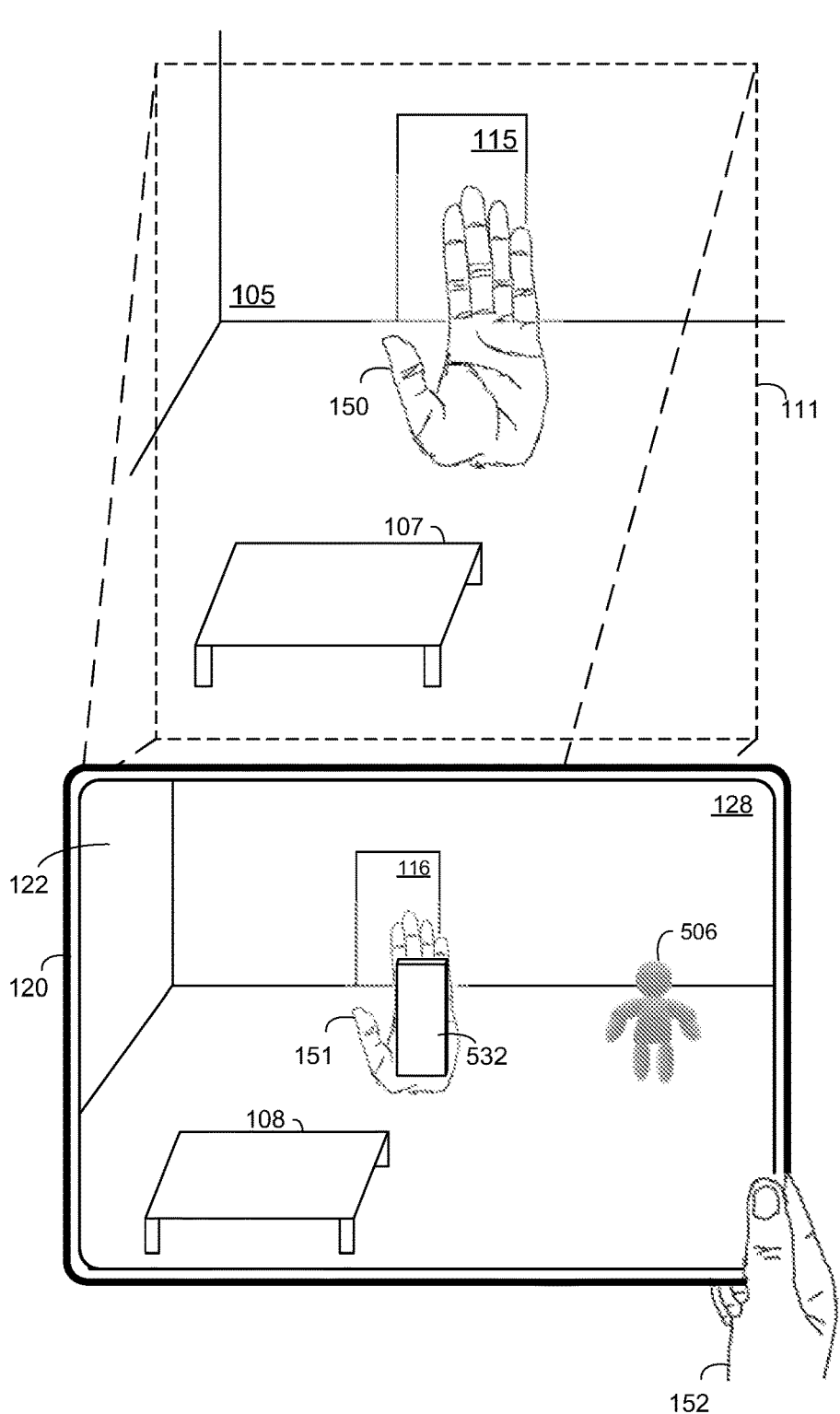
Figure 5D:
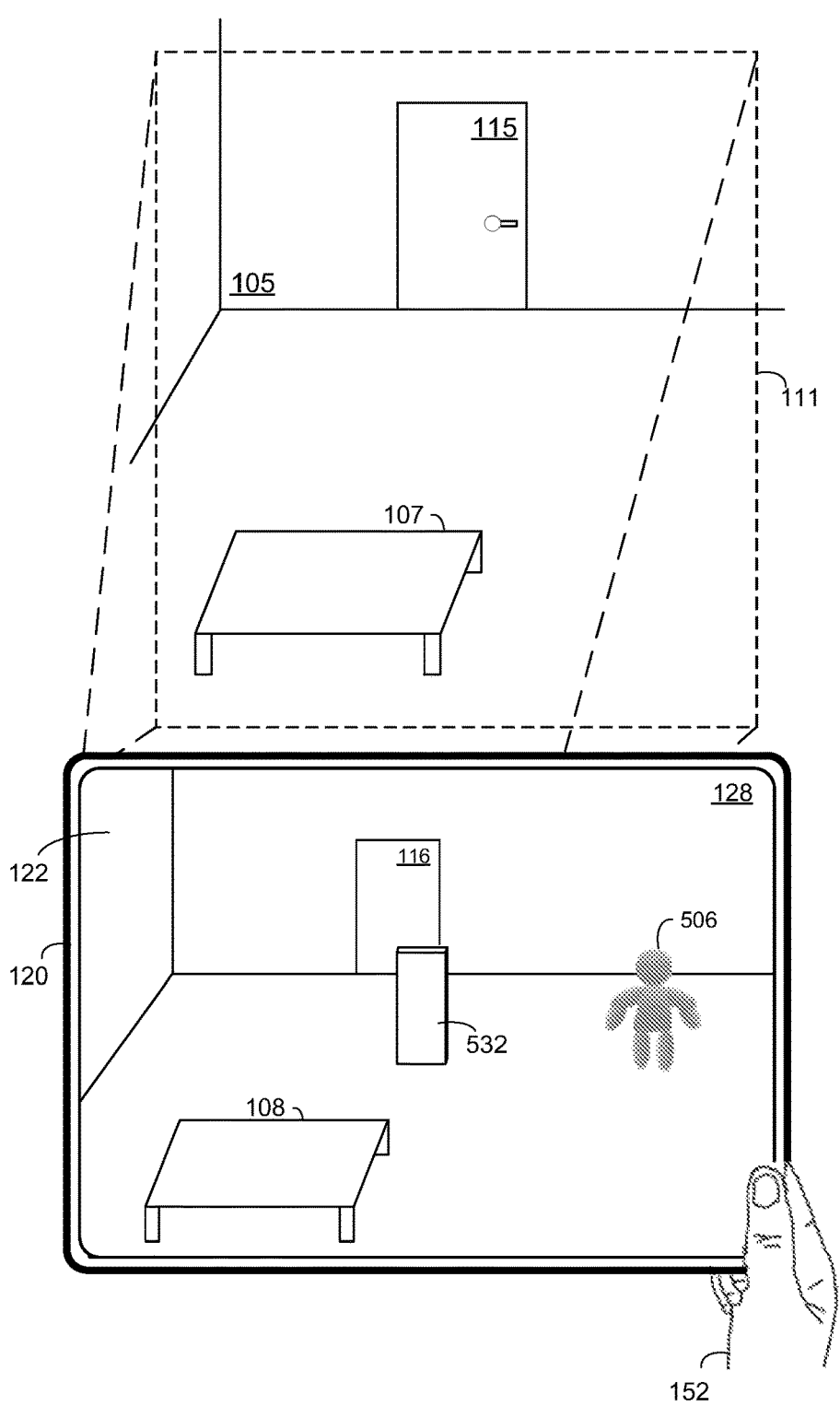
Figure 5E:
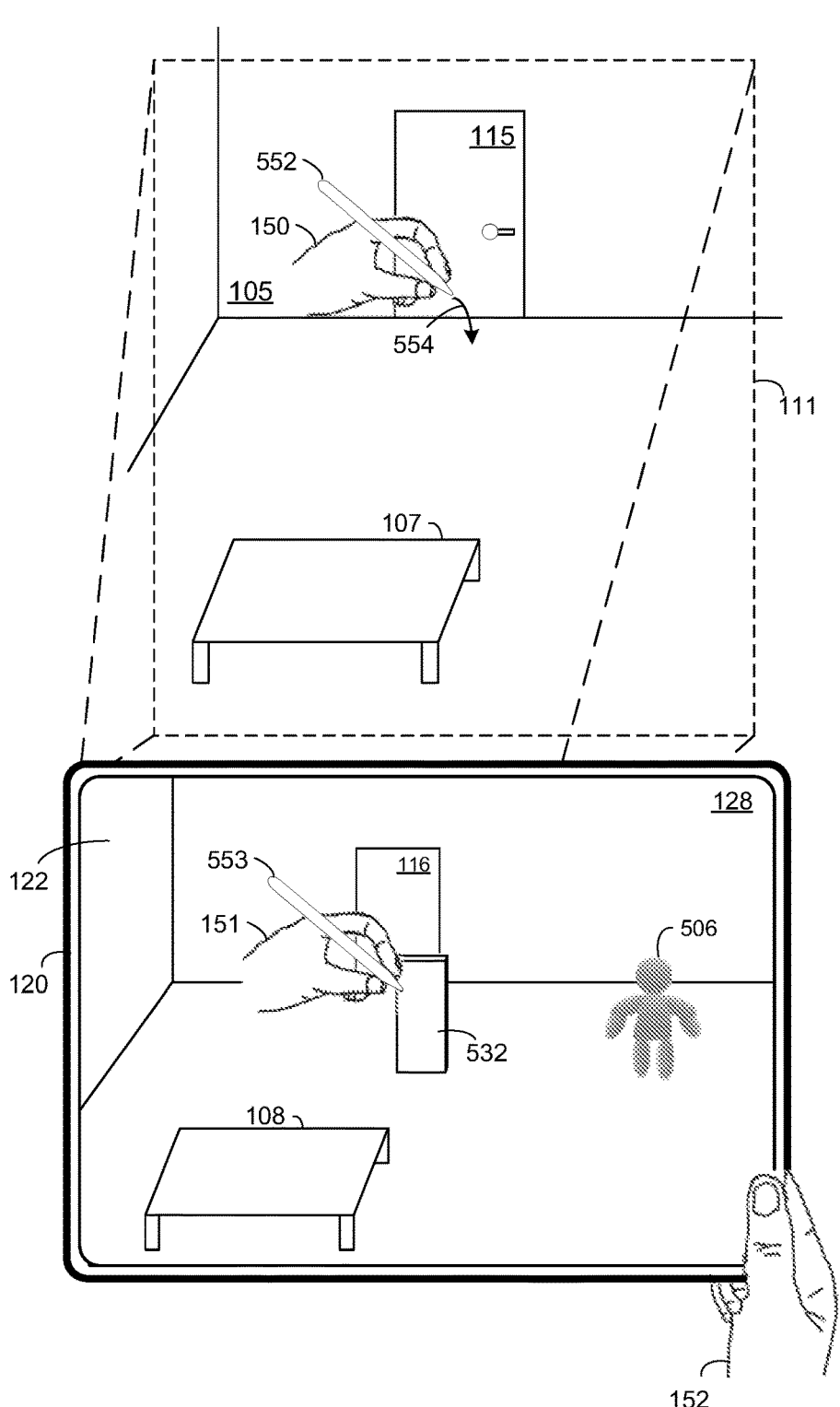
Figure 5F:
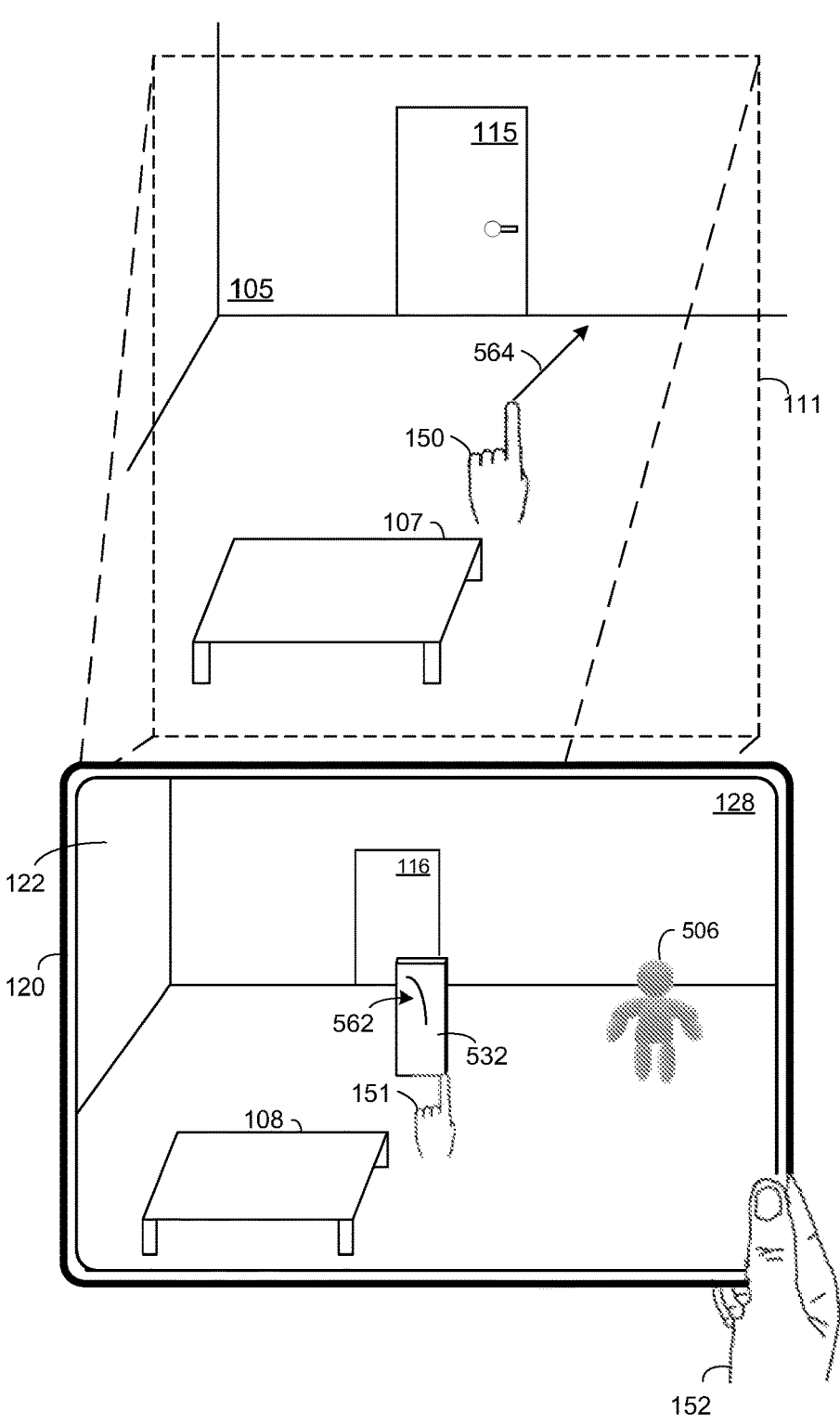
Figure 5G:
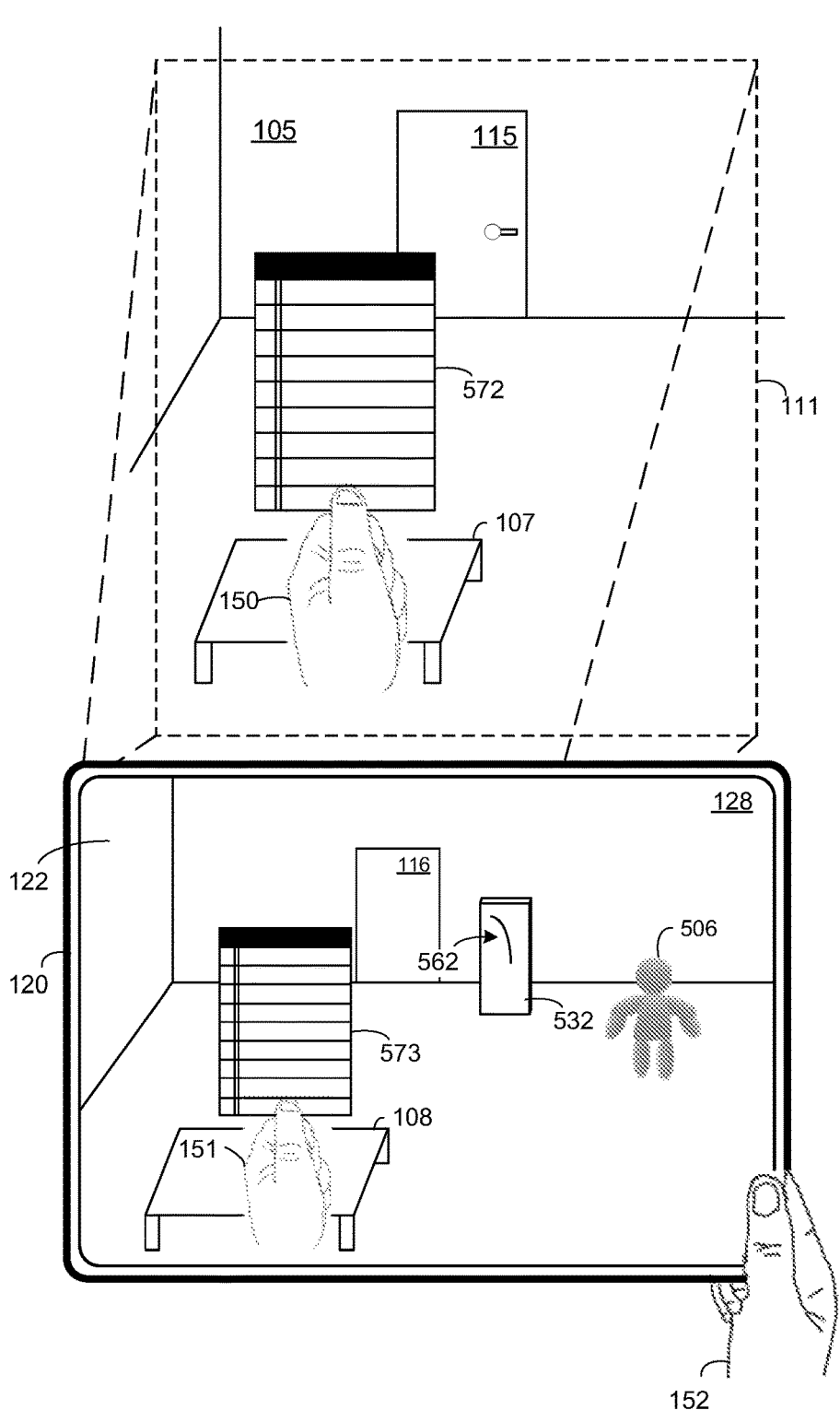
Figure 5H:
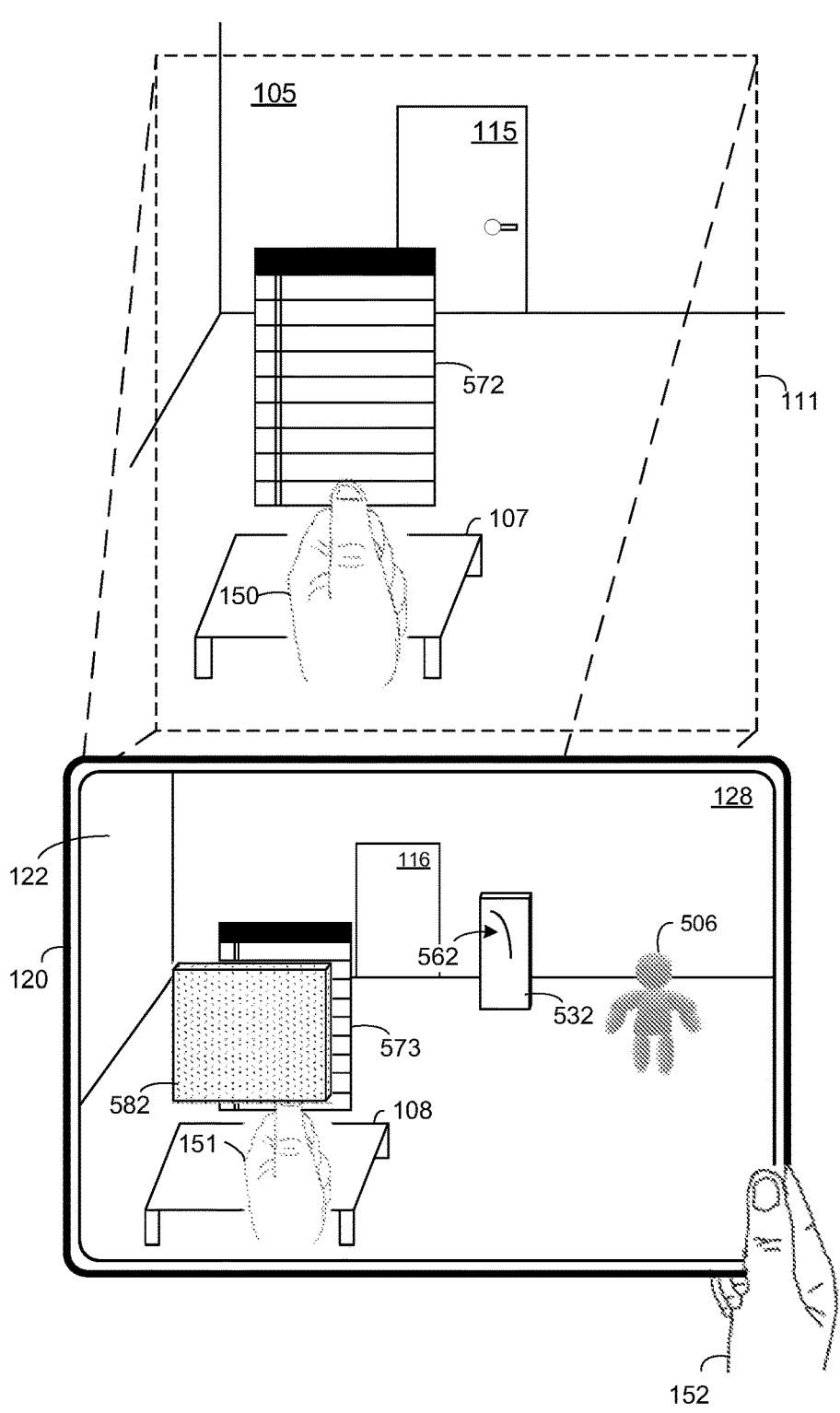
Figure 5I:
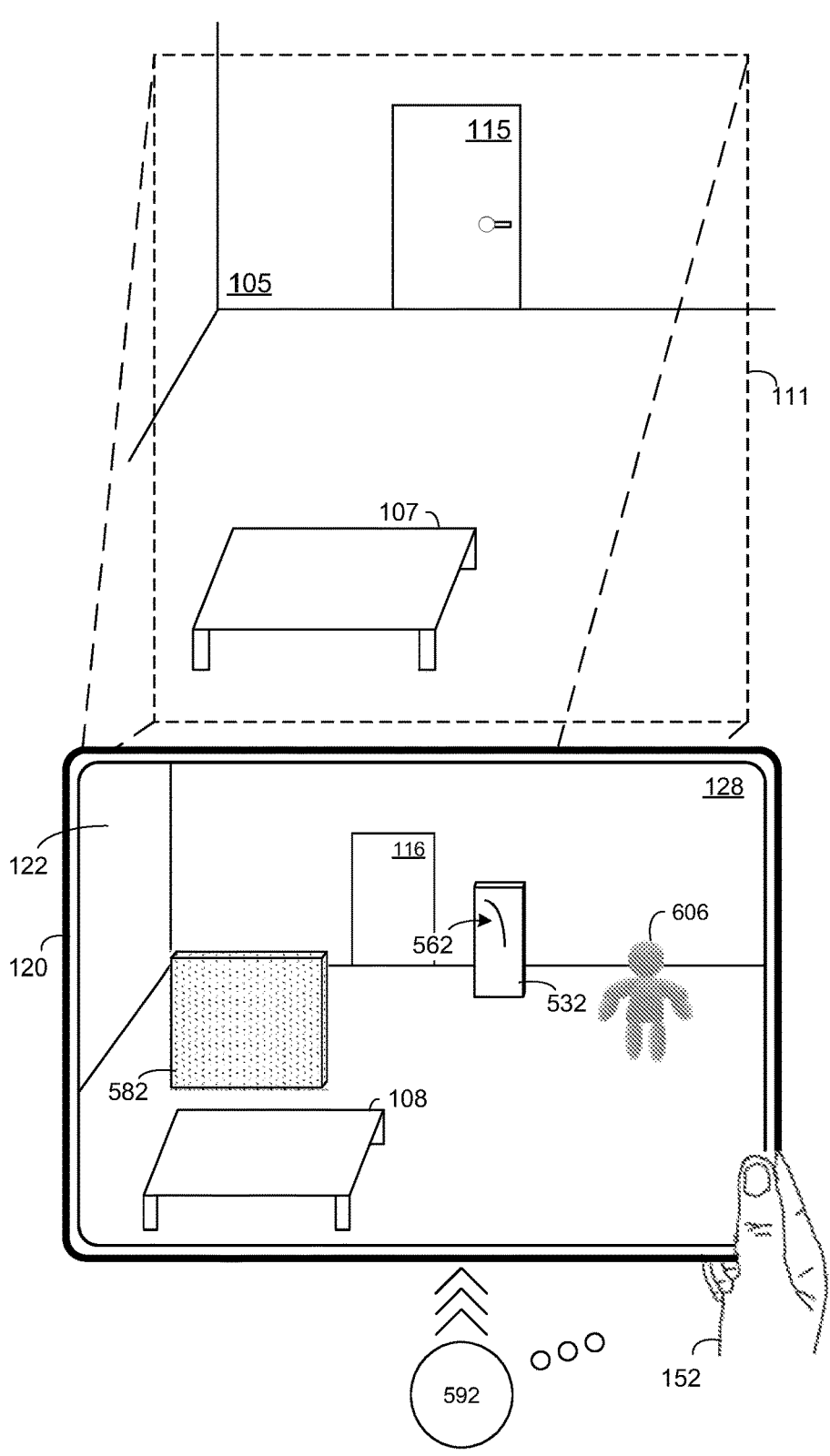
Figure 5J:
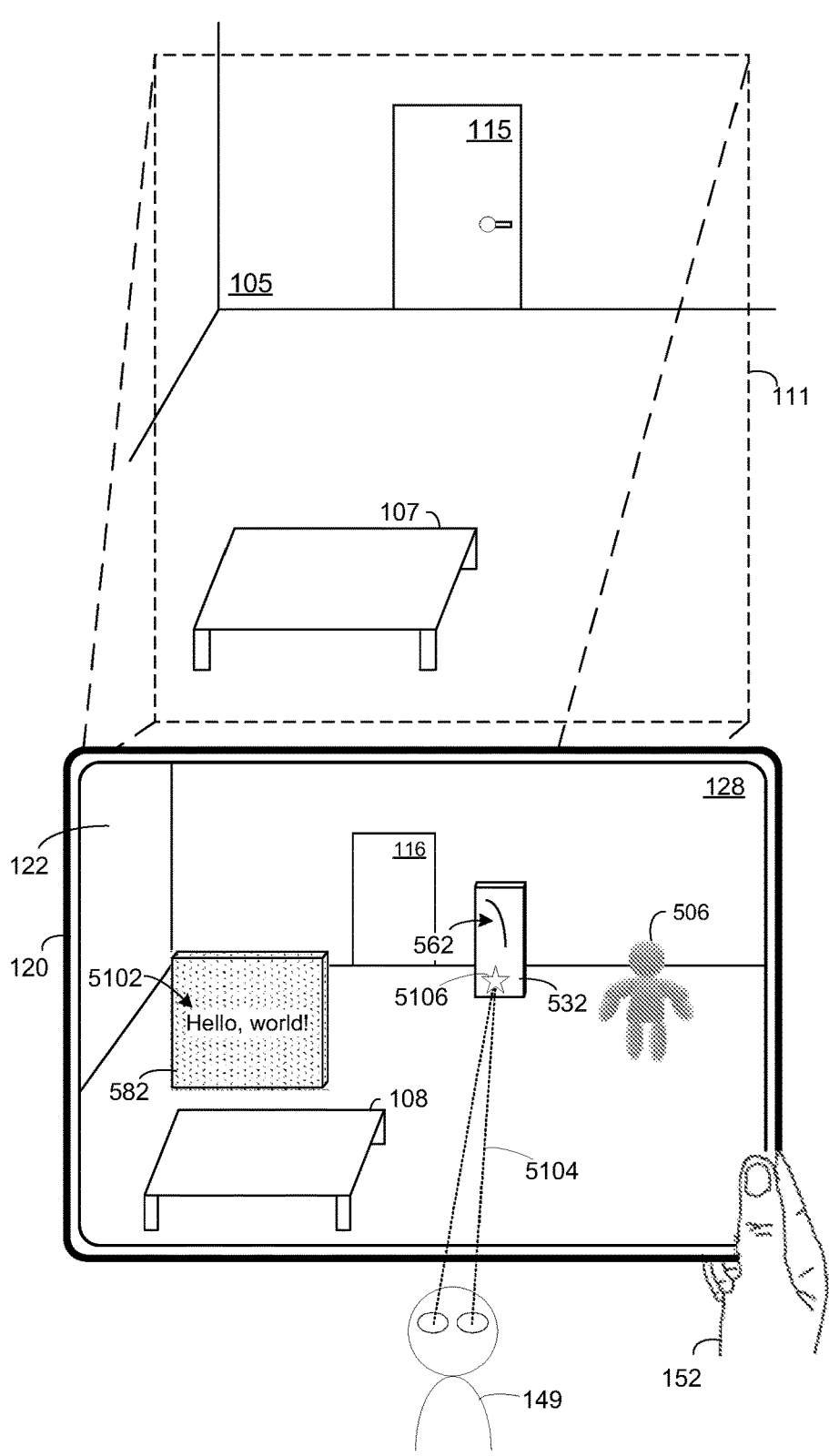
Figure 5K:
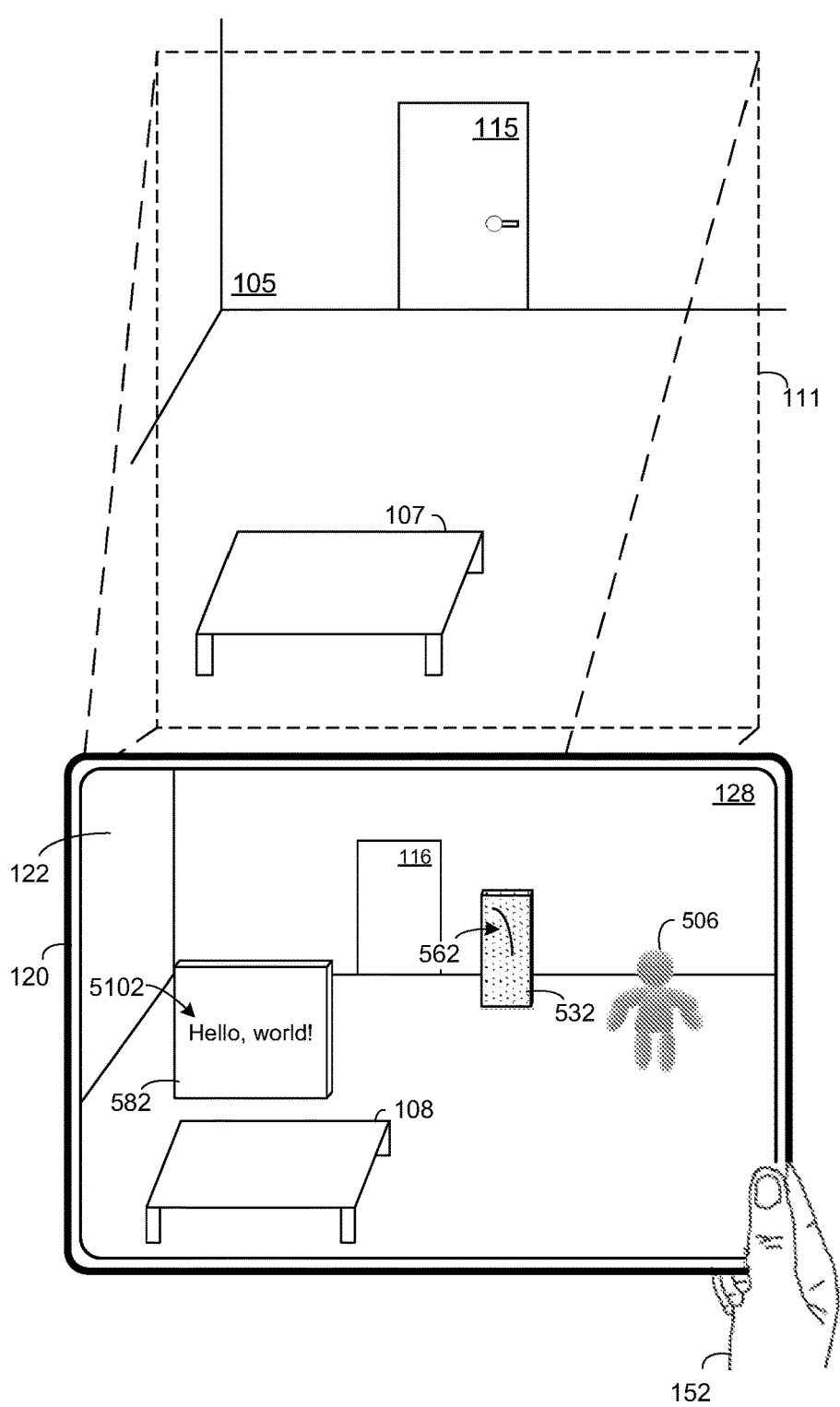
Figure 5L:
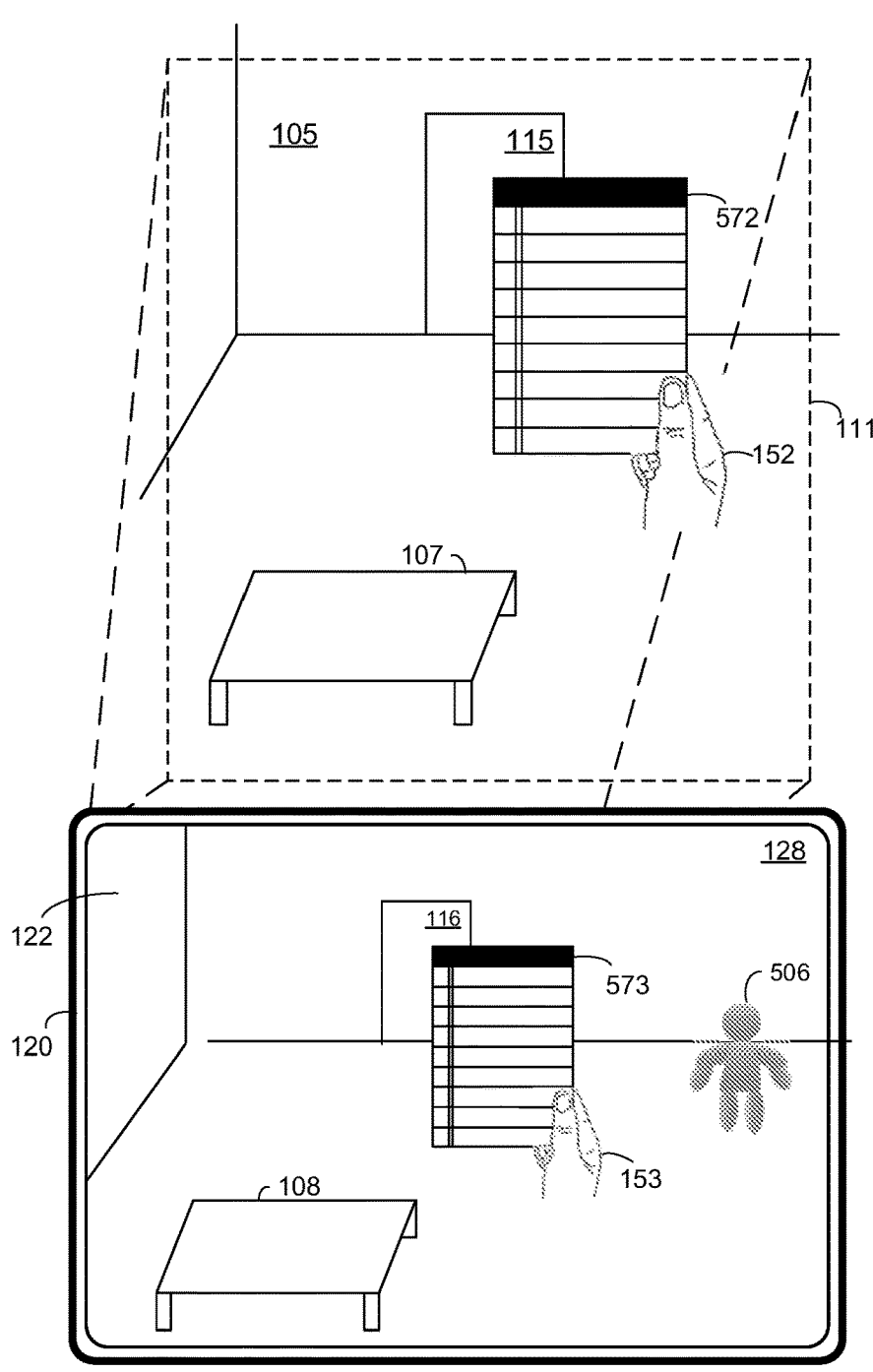
Figure 5M:
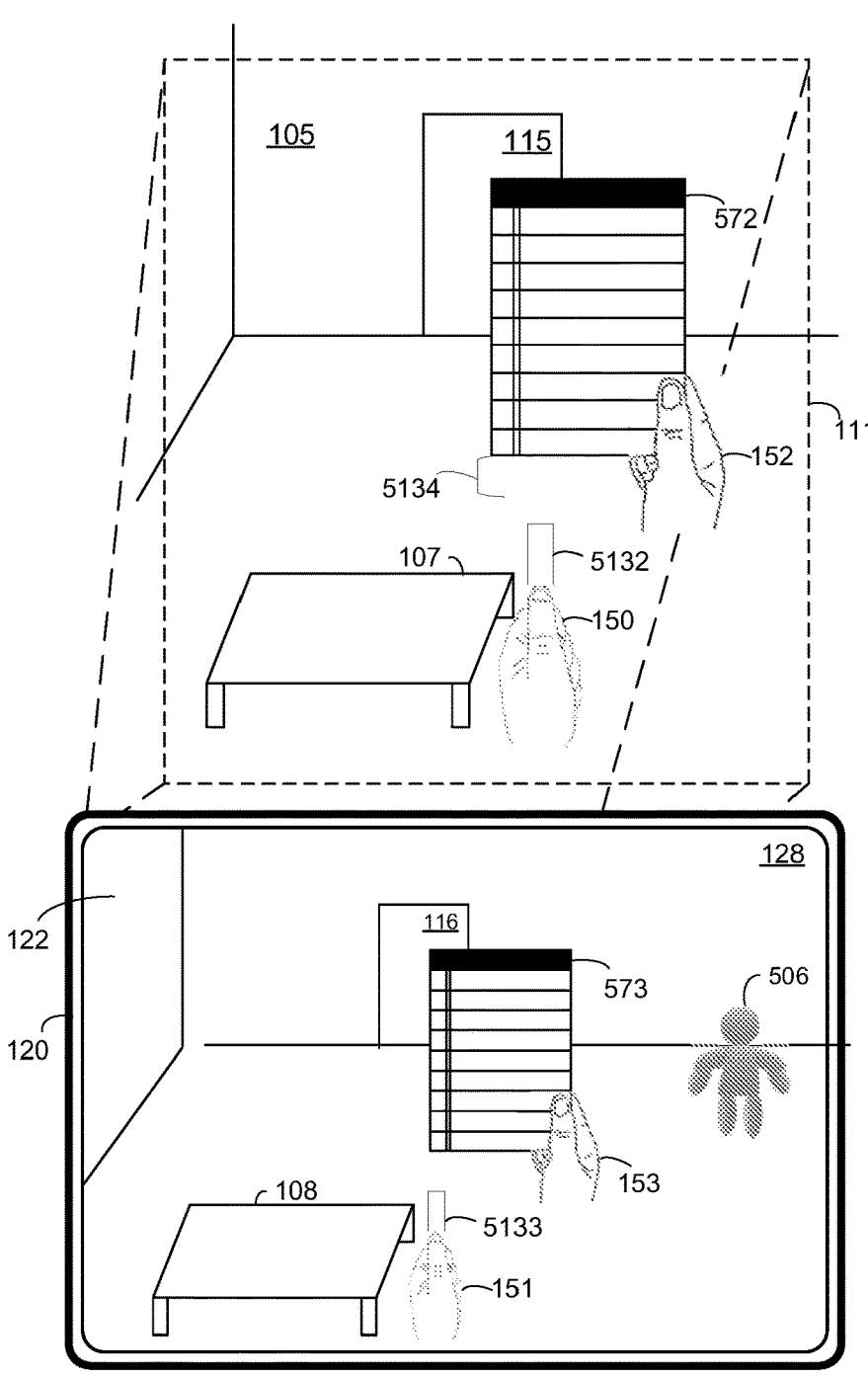
Figure 5N:
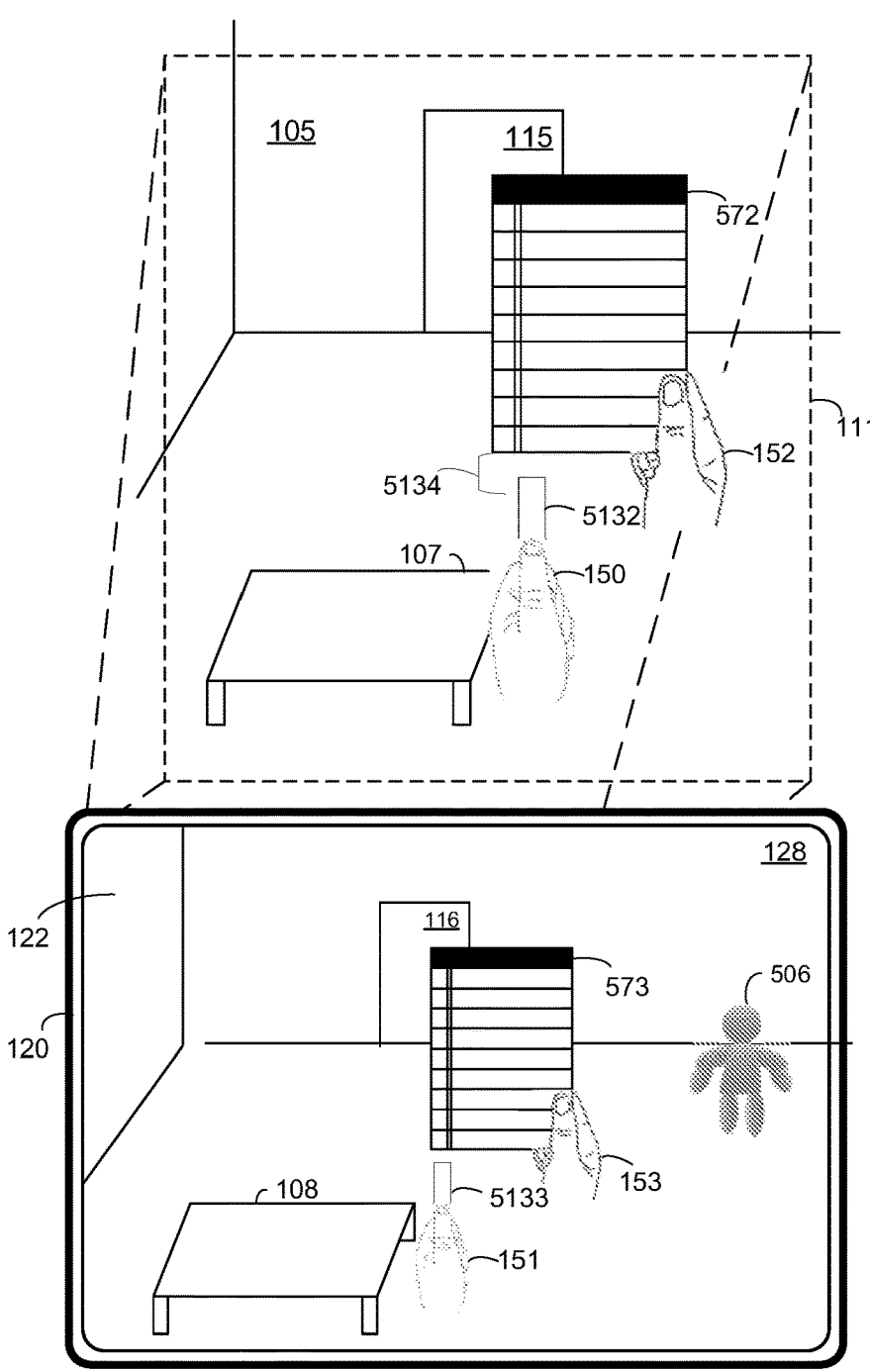
Figure 5O:
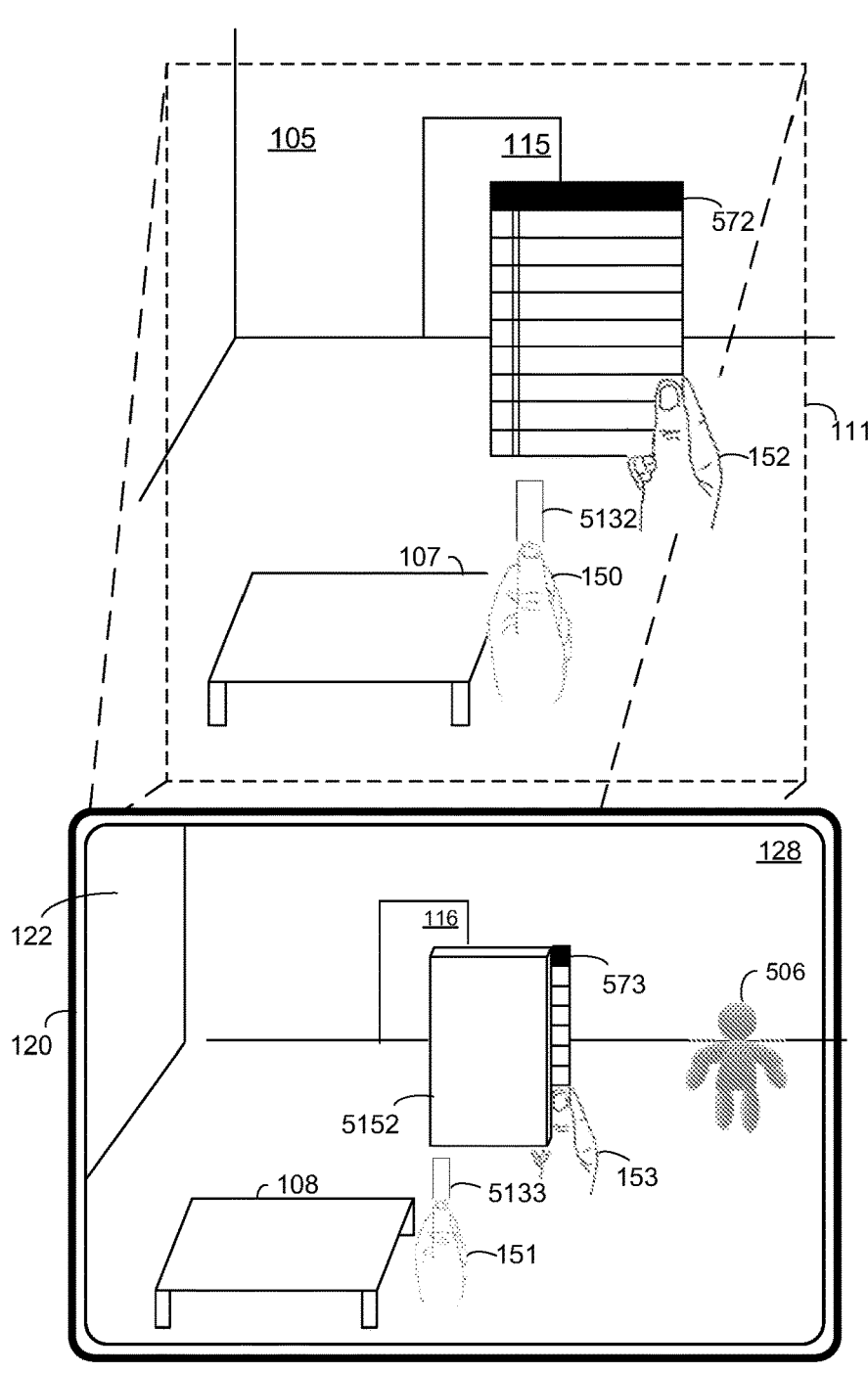
Figure 5P:
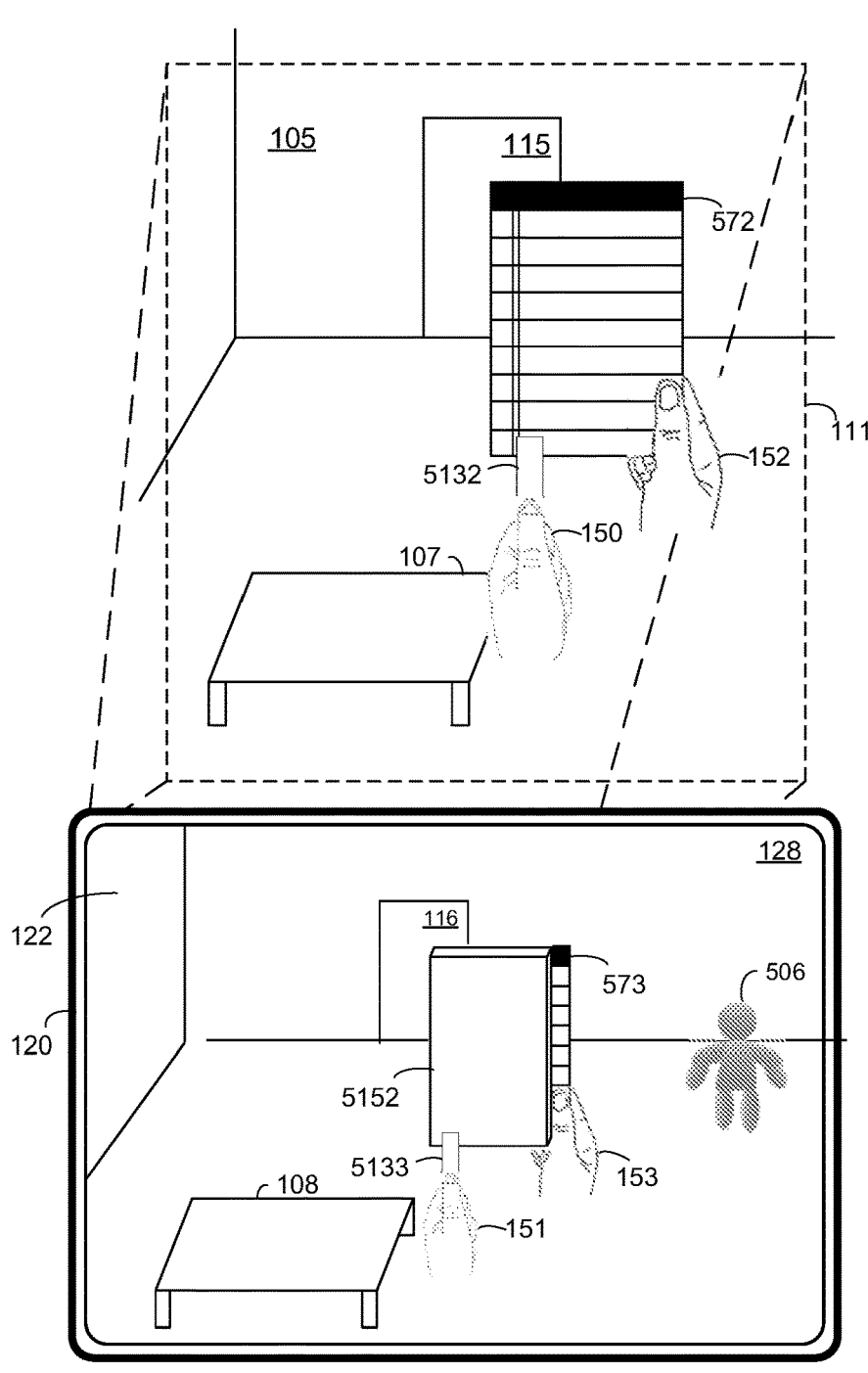
Figure 5Q:
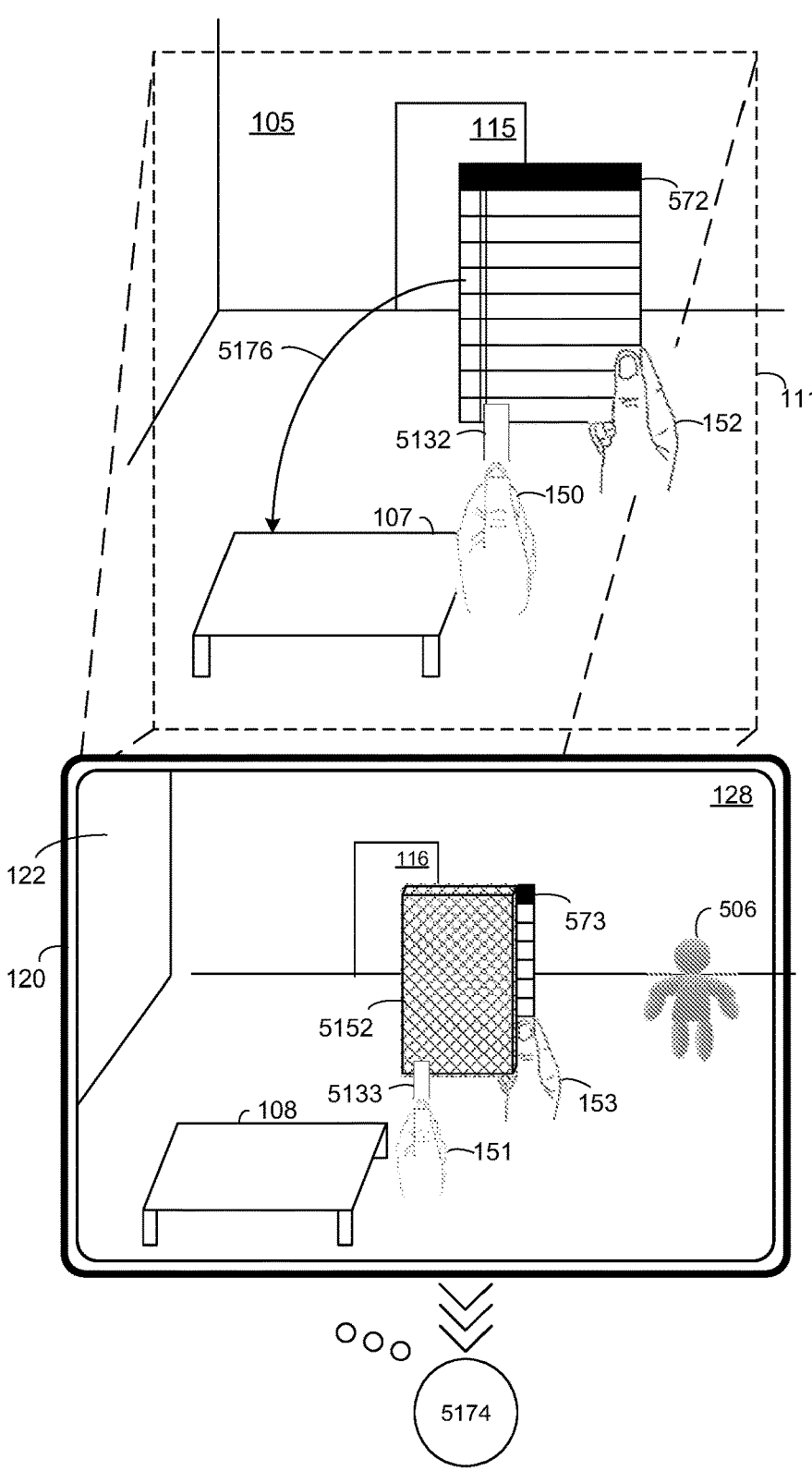
Figure 5R:
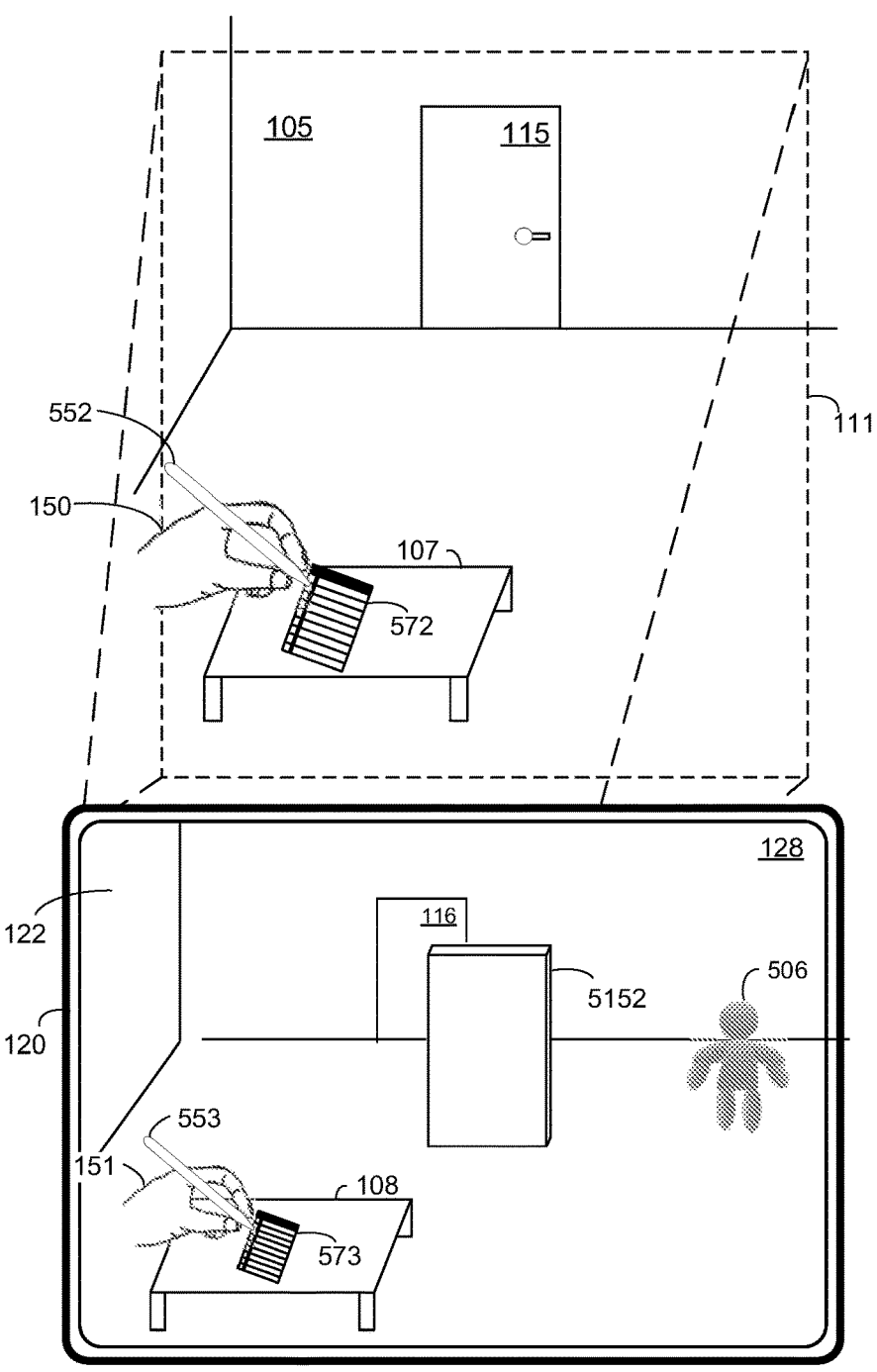
Figure 5S:
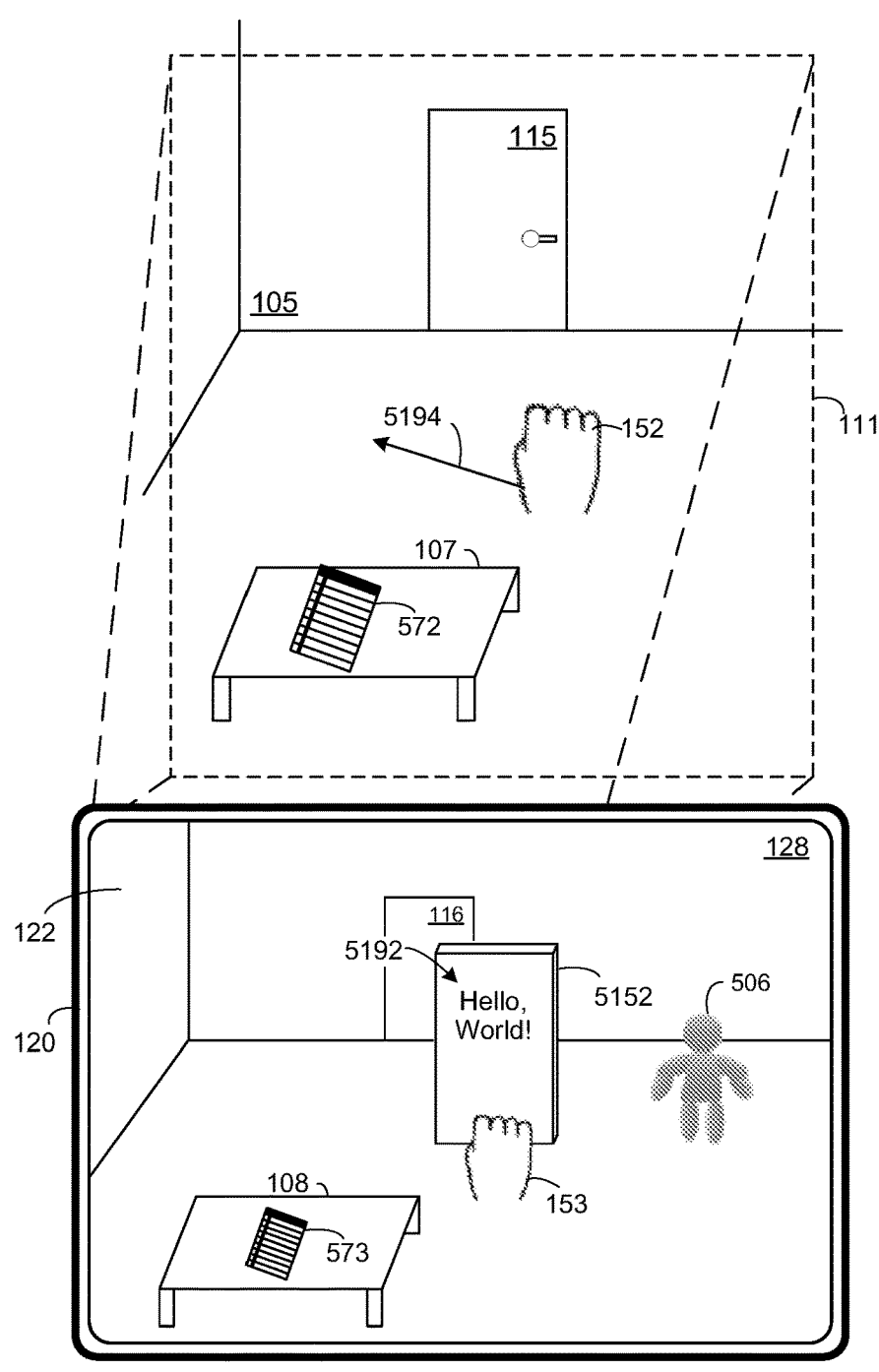
Figure 5T:
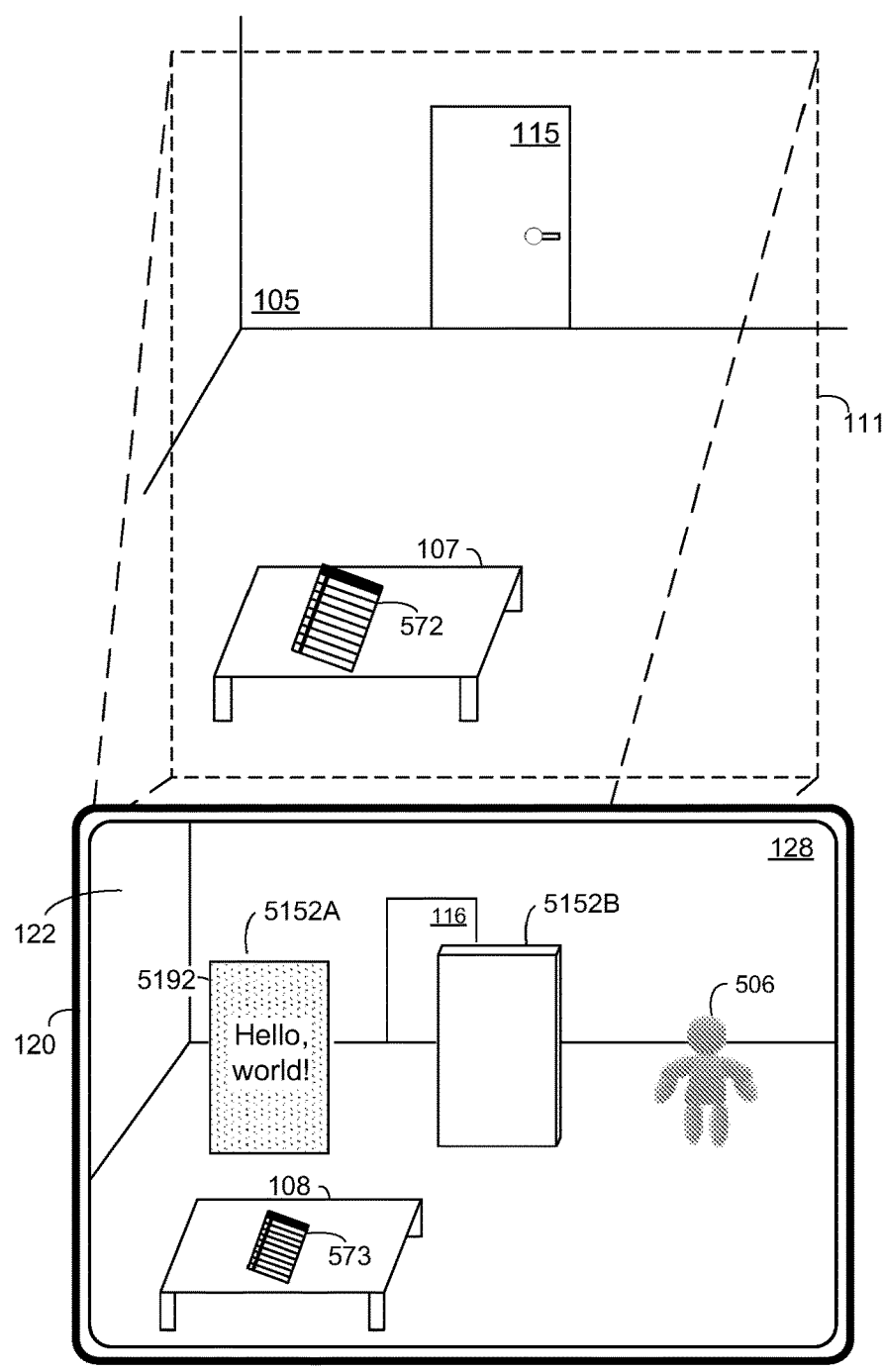

FIGS. 5A-5T illustrate a sequence of instances 510-5200 for a content delivery scenario in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the sequence of instances 510-5200 are rendered and presented by a computing system such as the controller 110 shown in FIGS. 1 and 2; the electronic device 120 shown in FIGS. 1 and 3; and/or a suitable combination thereof.

As shown in FIGS. 5A-5T, the content delivery scenario includes a physical environment 105 and an XR environment 128 presented on the display 122 of the electronic device 120 (e.g., associated with the user 149). The electronic device 120 presents the XR environment 128 to the user 149 while the user 149 is physically present within the physical environment 105 that includes a table 107 and a door 115, which are currently within the FOV 111 of an exterior-facing image sensor of the electronic device 120. As such, in some of FIGS. 5A-5T, the user 149 holds the electronic device 120 in their right hand 152 similar to the operating environment 100 in FIG. 1.

In other words, in some implementations, the electronic device 120 is configured to present XR content and to enable optical see-through or video pass-through of at least a portion of the physical environment 105 (e.g., a representation 108 of the table 107 and a representation 116 of the door 115 that are within the FOV 111 of the electronic device 120) on the display 122. For example, the electronic device 120 corresponds to a mobile phone, tablet, laptop, near-eye system, wearable computing device, or the like.

As shown in FIG. 5A, during the instance 510 (e.g., associated with time $T_1$) of the content delivery scenario, the electronic device 120 presents an XR environment 128 including a virtual agent (VA) 506, a representation 108 of the table 107 within the FOV 111 of the electronic device 120, and a representation 116 of the door 115 within the FOV 111 of the electronic device 120. Furthermore, the electronic device 120 detects/identifies an initial set of planes within the physical environment 105 including the surface of the table 107, the door 115, the walls of the physical environment 105, and the floor of the physical environment 105.

FIGS. 5B-5D illustrate a sequence in which the electronic device 120 presents a first XR surface 532 within the XR environment 128 in response to detecting a first physical plane within the physical environment 105. As shown in FIG. 5B, during the instance 520 (e.g., associated with time $T_2$) of the content delivery scenario, the electronic device 120 detects the left hand 150 of the user 149 within the FOV 111 of the electronic device 120, where the palm of the left hand 150 of the user 149 is facing the exterior-facing image sensor(s) of the electronic device 120. As shown in FIG. 5B, during the instance 520, the electronic device 120 also presents a representation 151 of the left hand 150 of the user 149 within the XR environment 128. Furthermore, the electronic device 120 detects/identifies a current set of planes within the physical environment 105 including the surface of the table 107, the door 115, the walls of the physical environment 105, the floor of the physical environment 105, and the palm of the left hand 150 of the user 149. As such, the current set of planes in FIG. 5B (e.g., associated with the time $T_2$) includes at least one additional plane (e.g., the palm of the left hand 150 of the user 149) in comparison to the initial set of planes in FIG. 5A (e.g., associated with the time $T_1$).

As shown in FIG. 5C, during the instance 530 (e.g., associated with time $T_3$) of the content delivery scenario, the electronic device 120 presents the first XR surface 532 at a first location that is coplanar with the representation 151 of the left hand 150 of the user 149 in response to detecting/identifying the at least one additional plane in FIG. 5B (e.g., the palm of the left hand 150 of the user 149) as compared to the initial set of planes in FIG. 5A. As shown in FIG. 5D, during the instance 540 (e.g., associated with time $T_4$) of the content delivery scenario, the electronic device 120 maintains presentation of the first XR surface 532 at the first location after detecting removal of the left hand 150 of the user 149 from the FOV 111 of the electronic device 120. In some implementations, as shown in FIGS. 5B-5D, the first XR surface 532 remains in place after the left hand 150 of the user 149 is removed from the FOV 111. In various implementations, the first XR surface 532 may follow the left hand 150 of the user 149 until the electronic device 120 detects an input (e.g., a touch input, a voice input, a hand/extremity tracking input, or the like), at which point the first XR surface 532 is locked in place.

FIGS. 5E and 5F illustrate a sequence in which the electronic device 120 presents a mark 562 on the first XR surface 532 within the XR environment 128 in response to detecting a marking input 554 (e.g., a direct marking input) with a control device 552 that is directed to the first XR surface 532. As shown in FIG. 5E, during the instance 550 (e.g., associated with time $T_5$) of the content delivery scenario, the electronic device 120 detects a marking input 554 with a control device 552 via object tracking and/or hand/extremity tracking. For example, the control device 552 corresponds to a stylus or the like that communicates with the controller 110 and/or electronic device 120. For example, the control device 552 includes one or more processors, non-transitory memory, a communication interface, a touch-sensitive surface, one or more integrated pressure sensors, a magnetometer, an accelerometer, an IMU, a gyroscope, and/or the like. As shown in FIG. 5E, the electronic device 120 also presents a representation 553 of the control device 552 being held by the representation 151 of the left hand 150 of the user 149 with a writing grip pose within the XR environment 128. In FIG. 5E, the representation 553 of the control device 552 is directed to the first XR surface 532 within the XR environment 128.

As shown in FIG. 5F, during the instance 560 (e.g., associated with time $T_6$) of the content delivery scenario, the electronic device 120 presents a mark 562 on the first XR surface 532 in response to detecting the marking input 554 in FIG. 5E. For example, the shape, depth, length, angle, etc. of the mark 562 corresponds to spatial parameters of the marking input 554 (e.g., positional values, rotational values, displacement, spatial acceleration, spatial velocity, angular acceleration, angular velocity, etc. associated with the marking input).

FIGS. 5F and 5G illustrate a sequence in which the electronic device 120 translates the first XR surface 532 within the XR environment 128 in response to detecting a manipulation input 564 via hand/extremity tracking. As shown in FIG. 5F, during the instance 560 (e.g., associated with time $T_6$) of the content delivery scenario, the electronic device 120 also detects a manipulation input 564 with the left hand 150 of the user 149 via hand/extremity tracking. As shown in FIG. 5G, during the instance 570 (e.g., associated with time $T_7$) of the content delivery scenario, the electronic device 120 translates the first XR surface 532 from the first location to a second location within the XR environment 128 in response to detecting the manipulation input 564 in FIG. 5F. For example, the directionality and displacement of translational movement of the first XR surface 532 within the XR environment 128 corresponds to spatial parameters of the manipulation input 564 in FIG. 5F (e.g., change in positional values, change in rotational values, displacement, spatial acceleration, spatial velocity, angular acceleration, angular velocity, etc.). One of ordinary skill in the art will appreciate that the first XR surface 532 may be similarly rotated.

FIGS. 5G-5I illustrate a sequence in which the electronic device 120 presents a second XR surface 582 within the XR environment 128 in response to detecting a second physical plane within the physical environment 105. As shown in FIG. 5G, during the instance 570 (e.g., associated with time $T_7$) of the content delivery scenario, the electronic device 120 also detects a pad of paper 572 being held by the left hand 150 of the user 149 within the FOV 111 of the electronic device 120. As shown in FIG. 5G, the electronic device 120 also presents a representation 573 of the pad of paper 572 being held by a representation 151 of the left hand 150 of the user 149 within the XR environment 128. Furthermore, the electronic device 120 detects/identifies a current set of planes within the physical environment 105 including the surface of the table 107, the door 115, the walls of the physical environment 105, the floor of the physical environment 105, and the pad of paper 572. As such, the current set of planes in FIG. 5G (e.g., associated with the time $T_7$) includes at least one additional plane (e.g., the pad of paper 572) in comparison to the initial set of planes in FIG. 5A (e.g., associated with the time $T_1$) or the set of planes associated with the previous time period in FIG. 5F.

As shown in FIG. 5H, during the instance 580 (e.g., associated with time $T_8$) of the content delivery scenario, the electronic device 120 presents the second XR surface 582 at a location that may be offset in at least one spatial dimension (e.g., x, y, and/or z) relative to the representation 573 of the pad of paper 572 in response to detecting/identifying the at least one additional plane (e.g., the pad of paper 572) in comparison to the initial set of planes in FIG. 5A or the set of planes associated with the previous time period in FIG. 5F. As shown in FIG. 5H, the electronic device 120 presents the second XR surface 582 with a texture to indicate that the second XR surface 582 is currently selected or in focus within the XR environment 128 in contrast to the first XR surface 532. As shown in FIG. 5I, during the instance 590 (e.g., associated with time $T_9$) of the content delivery scenario, the electronic device 120 maintains presentation of the second XR surface 582 at its initial location after detecting removal of the pad of paper 572 from the FOV 111 of the electronic device 120. One of ordinary skill in the art will appreciate that the visual change to the appearance of the second XR surface 582 may be different in various other implementations such as a change of color, a change of brightness, a change of shape, an added frame or border, an added glow or highlight, and/or the like. One of ordinary skill in the art will appreciate that the electronic device 120 may provide different or additional to indicate the current selected XR content such as audible feedback or the like.

In some implementations, as shown in FIGS. 5G-5I, the second XR surface 582 remains in place after the pad of paper 572 is removed from the FOV 111. In various implementations, the second XR surface 582 may follow the pad of paper 572 until the electronic device 120 detects an input (e.g., a touch input, a voice input, a hand/extremity tracking input, or the like), at which point the second XR surface 582 is locked in place.

FIGS. 5I and 5J illustrate a sequence in which the electronic device 120 presents text 5102 on the second XR surface 582 within the XR environment 128 in response to detecting a dictation input 592. As shown in FIG. 5I, during the instance 590 (e.g., associated with time $T_9$) of the content delivery scenario, the electronic device 120 detects a dictation input 592 (e.g., a speech command, a speech input, or the like) via one or more microphones while the second XR surface 582 is currently selected or in focus within the XR environment 128. For example, the electronic device 120 converts the dictation input 592 into text based on one or more speech-to-text techniques. As shown in FIG. 5J, during the instance 5100 (e.g., associated with time $T_{10}$) of the content delivery scenario, the electronic device 120 presents text 5102 (e.g., "Hello, world!") on the second XR surface 582 in response to detecting the dictation input 592 in FIG. 5I.

FIGS. 5J and 5K illustrate a sequence in which the electronic device 120 changes focus from the second XR surface 582 to the first XR surface 532 within the XR environment 128 in response to detecting a gaze direction directed to the first XR surface 532 for at least a predetermined or non-deterministic time period. As shown in FIG. 5J, during the instance 5100 (e.g., associated with time $T_{10}$) of the content delivery scenario, the electronic device 120 also presents an indicator 5106 on the first XR surface 531 associated with the gaze direction 5104 of the user 149. In one example, the indicator 5106 corresponds to a focal point of the eyes of the user 149. In another example, the indicator 5106 corresponds to a coincidence point between rays emanating from the eyes of the user 149 and the first XR surface 532. In some implementations, the electronic device 120 visualizes the gaze direction 5104 of the user 149 within the XR environment 128. In some implementations, the electronic device 120 does not visualize the gaze direction 5104 of the user 149 within the XR environment 128.

According to some implementations, the electronic device 120 selects or changes the focus to respective XR content when the gaze direction 5104 is directed to the respective XR content for at least a predetermined time period. According to some implementations, the electronic device 120 selects or changes the focus to respective XR content when the gaze direction 5104 is directed to the respective XR content for at least a non-deterministic time period, wherein the non-deterministic time period is based on user preferences, usage history, frequently selected XR content, recently selected XR content, and/or other contextual information. One of ordinary skill in the art will appreciate that other input modalities may be used to select or switch focus between XR content or XR objects such as touch inputs, speech command/inputs, hand/extremity tracking, and/or the like.

As shown in FIG. 5K, during the instance 5110 (e.g., associated with time $T_{11}$) of the content delivery scenario, the electronic device 120 removes the texture from the second XR surface 582 and presents the first XR surface 532 with the texture to indicate that the first XR surface 532 is currently selected or in focus within the XR environment 128 in response to detecting the gaze direction 5104 of the user 149 being directed to the first XR surface 532 for at least the predetermined or non-deterministic time period.

FIGS. 5L-5O illustrate a sequence in which the electronic device 120 presents an XR surface 5152 within the XR environment 128 in response to detecting a plane associated with the pad of paper 572 within the physical environment 105 and in accordance with a determination that a physical proxy object 5132 breaches a predetermined or non-deterministic distance threshold relative to a representation 573 of the pad of paper 572 (also referred to herein as a "proximity condition"). As shown in FIG. 5L, during the instance 5120 (e.g., associated with time $T_{12}$) of the content delivery scenario, the electronic device 120 detects a pad of paper 572 being held by the right hand 152 of the user 149 within the FOV 111 of the electronic device 120. As shown in FIG. 5L, during the instance 5120, the electronic device 120 also presents a representation 573 of the pad of paper 572 being held by a representation 153 of the right hand 152 of the user 149 within the XR environment 128.

As shown in FIG. 5M, during the instance 5130 (e.g., associated with time $T_{13}$) of the content delivery scenario, the electronic device 120 detects a physical proxy object 5132 being held by the left hand 150 of the user 149 within the FOV 111 of the electronic device 120 via object tracking and/or hand/extremity tracking. As shown in FIG. 5M, during the instance 5130, the electronic device 120 also presents a representation 5133 of the physical proxy object 5132 being held by the representation 151 of the left hand 150 of the user 149 within the XR environment 128. In FIG. 5M, the physical proxy object 5132 (or the representation thereof) held by the left hand 150 of the user 149 fails to breach a predetermined or non-deterministic distance threshold 5134 relative to the pad of paper 572 (e.g., an X cm radius surrounding the pad of paper 572). In other words, the proximity condition is not satisfied in FIG. 5M. For example, the physical proxy object 5132 corresponds to a ruler, a stick, or the like that does not communicate with the controller 110 and/or electronic device 120. Continuing with this example, the controller 110 and/or electronic device 120 tracks the physical proxy object 5132 via object tracking with one or more computer vision (CV) techniques. As another example, if the physical proxy object 5132 corresponds to a stylus or electronic handheld device with an integrated IMU, magnetometer, or other sensor, the controller 110 and/or electronic device 120 may localize the physical proxy object 5132 based on sensor data from the physical proxy object 5132.

As shown in FIG. 5N, during the instance 5140 (e.g., associated with time $T_{14}$) of the content delivery scenario, the electronic device 120 determines that the physical proxy object 5132 held by the left hand 150 of the user 149 breaches the predetermined or non-deterministic distance threshold 5134 relative to the pad of paper 572 via object tracking and/or hand/extremity tracking. In other words, the proximity condition is satisfied in FIG. 5N. As shown in FIG. 5O, during the instance 5150 (e.g., associated with time $T_{15}$) of the content delivery scenario, the electronic device 120 presents the XR surface 5152 at a location that is substantially coplanar with the representation 573 of the pad of paper 572 in response to detecting/identifying the at least one additional plane (e.g., the pad of paper 572) in comparison to the initial set of planes in FIG. 5A and in accordance with a determination that the physical proxy object 5132 (or the representation thereof) held by the left hand 150 of the user 149 breaches the predetermined or non-deterministic distance threshold 5134 relative to the pad of paper 572 in FIG. 5N.

FIGS. 5P and 5Q illustrate a sequence in which the electronic device 120 presents feedback (e.g., audio and visual) indicating that the physical proxy object 5132 contacts the pad of paper 572. As shown in FIG. 5P, during the instance 5160 (e.g., associated with time $T_{16}$) of the content delivery scenario, the electronic device 120 determines that the physical proxy object 5132 held by the left hand 150 of the user 149 contacts the pad of paper 572 via object tracking and/or hand/extremity tracking. As shown in FIG. 5Q, during the instance 5170 (e.g., associated with time $T_{17}$) of the content delivery scenario, the electronic device 120 changes an appearance of the XR surface 5152 (e.g., from a white fill to a textured fill) in response to determining that the physical proxy object 5132 held by the left hand 150 of the user 149 contacts the pad of paper 572 in FIG. 5P. As shown in FIG. 5Q, the electronic device 120 also provides audio feedback 5174 in response to determining that the physical proxy object 5132 held by the left hand 150 of the user 149 contacts the pad of paper 572 in FIG. 5P. For example, the audio feedback 5174 corresponds to a singular tone, a multi-tone sequence, a song, a speech output, or the like indicating that the physical proxy object 5132 held by the left hand 150 of the user 149 has contacted the pad of paper 572. One of ordinary skill in the art will appreciate that the visual change to the appearance of the XR surface 5152 may be different in various other implementations such as a change of color, a change of brightness, a change of shape, an added frame or border, an added glow or highlight, and/or the like. One of ordinary skill in the art will appreciate that the electronic device 120 may provide different or additional feedback such as haptic feedback or the like.

FIGS. 5Q and 5R illustrate a sequence in which the electronic device 120 maintains presentation of the XR surface 5152 at its initial location after detecting translational movement 5176 of the pad of paper 572 to a surface of the table 107 within the from the FOV 111 of the electronic device 120. As shown in FIG. 5Q, during the instance 5170 (e.g., associated with time $T_{17}$) of the content delivery scenario, the electronic device 120 detects translational movement 5176 of the pad of paper 572 to a surface of the table 107. As shown in FIG. 5R, during the instance 5180 (e.g., associated with time $T_{18}$) of the content delivery scenario, the electronic device 120 maintains presentation of the XR surface 5152 at its initial location after detecting the translational movement 5176 of the pad of paper 572 in FIG. 5Q.

In some implementations, as shown in FIGS. 5Q and 5R, the XR surface 5152 remains in place after the pad of paper 572 is moved to the surface of the table 107. In various implementations, the XR surface 5152 may follow the pad of paper 572 until the electronic device 120 detects an input (e.g., a touch input, a voice input, a hand/extremity tracking input, or the like), at which point the XR surface 5152 is locked in place.

FIGS. 5R and 5S illustrate a sequence in which the electronic device 120 presents text 5192 on the XR surface 5152 within the XR environment 128 in response to detecting a marking input (e.g., an indirect marking input) with a control device 552 directed to the pad of paper 572. As shown in FIG. 5R, during the instance 5180 (e.g., associated with time $T_{18}$) of the content delivery scenario, the electronic device 120 also detects a marking input directed to the pad of paper 572 with the control device 552 via object tracking and/or hand/extremity tracking. As shown in FIG. 5R, the electronic device 120 also presents a representation 553 of the control device 552 being held by the representation 151 of the left hand 150 of the user 149 with the writing grip pose within the XR environment 128. In FIG. 5R, the representation 553 of the control device 552 is directed to the representation of the 573 of the pad of paper 572 within the XR environment 128.

As shown in FIG. 5S, during the instance 5190 (e.g., associated with time $T_{19}$) of the content delivery scenario, the electronic device 120 presents text 5192 (e.g., "Hello, world!") on the XR surface 5152 in response to detecting the marking input in FIG. 5R. For example, the electronic device 120 converts writing made on the pad of paper 572 by the user 149 to text based on an optical character recognition technique or the like.

FIGS. 5S and 5T illustrate a sequence in which the electronic device 120 presents a first XR surface 5152A and a second XR surface 5152B in response to detecting a manipulation input 5194 (e.g., a tear-off gesture) directed to the XR surface 5152. As shown in FIG. 5S, during the instance 5190 (e.g., associated with time $T_{19}$) of the content delivery scenario, the electronic device 120 also detects a manipulation input 5194 directed to the XR surface 5152 with the representation 153 of the right hand 152 of the user 149 via hand/extremity tracking. For example, the manipulation input 5194 corresponds to a pull and tear gesture similar to peeling a top sticky note from a pad thereof or tearing a sheet of paper from a pad thereof.

As shown in FIG. 5T, during the instance 5200 (e.g., associated with time $T_{20}$) of the content delivery scenario, the electronic device 120 presents a first XR surface 5152A including the text 5192 and a second XR surface 5152B in response to detecting the manipulation input 5194 directed to the XR surface 5152 in FIG. 5S. In some implementations, the electronic device 120 also presents an animation associated with the manipulation input 5194 similar to peeling a top sticky note from a pad of sticky notes or tearing a sheet of paper from a pad of paper. As shown in FIG. 5T, the electronic device 120 presents the first XR surface 5152A with a texture to indicate that the first XR surface 5152A is currently selected or in focus within the XR environment 128 in contrast to the second XR surface 5152B.

Figure 6A:
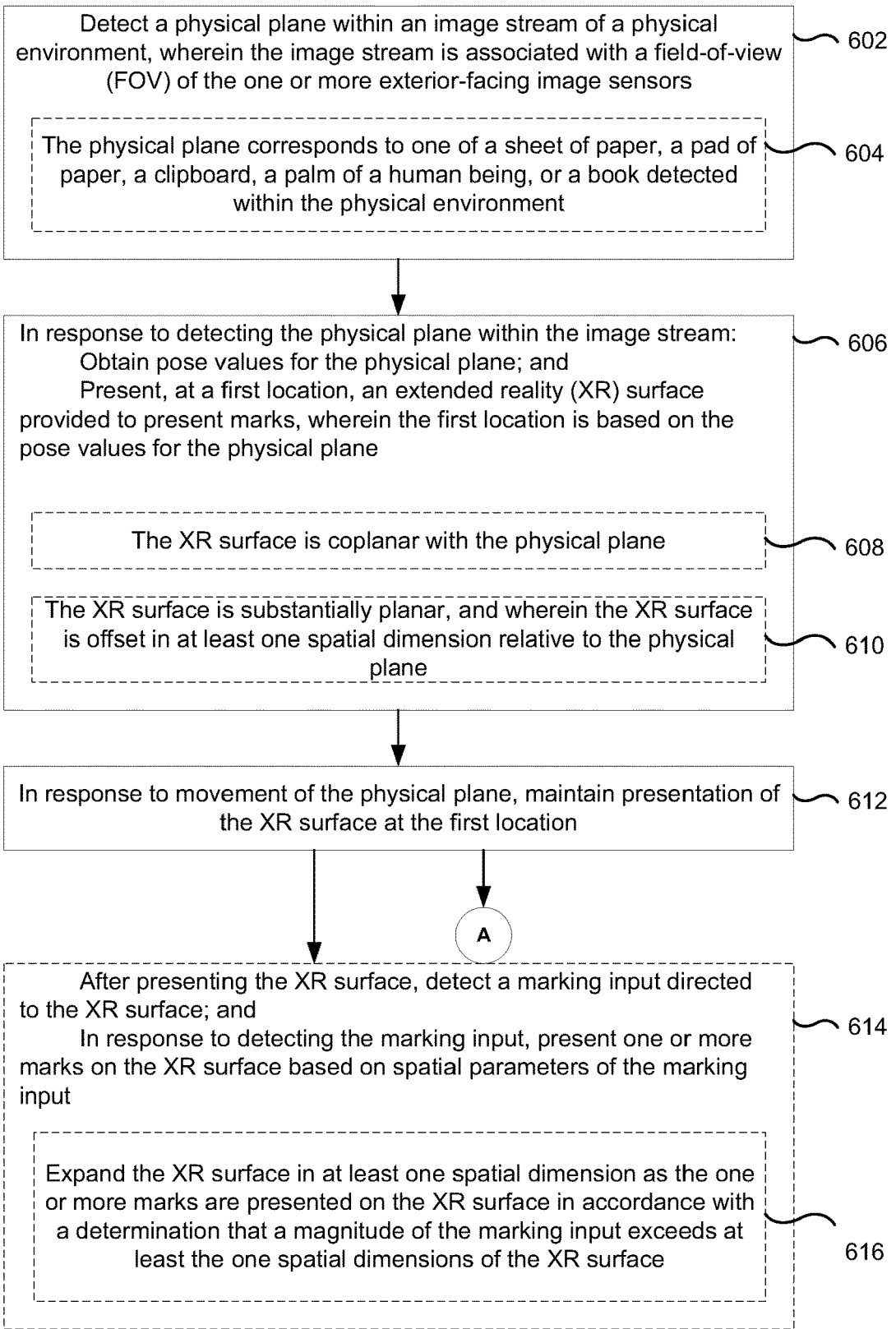

FIGS. 6A and 6B illustrate a flowchart representation of a method 600 of invoking an XR surface in accordance with some implementations. In various implementations, the method 600 is performed at a computing system including non-transitory memory and one or more processors, wherein the computing system is communicatively coupled to a display device, one or more exterior-facing image sensors, and one or more input devices (e.g., the electronic device 120 shown in FIGS. 1 and 3; the controller 110 in FIGS. 1 and 2; or a suitable combination thereof). In some implementations, the method 600 is performed by processing logic, including hardware, firmware, software, or a combination thereof. In some implementations, the method 600 is performed by a processor executing code stored in a non-transitory computer-readable medium (e.g., a memory). In some implementations, the computing system corresponds to one of a tablet, a laptop, a mobile phone, a near-eye system, a wearable computing device, or the like. In some implementations, the one or more input devices correspond to a computer vision (CV) engine that uses an image stream from the one or more exterior-facing image sensors, an object tracking engine, a head/body pose tracking engine, a finger/hand/extremity tracking engine, an eye tracking engine, a touch-sensitive surface, one or more microphones, and/or the like.

As discussed above, a user may invoke a note or a blank text entry document by launching an appropriate application. However, the application launch process may include several steps that could distract a user from their workflow. As such, in various implementations, a user may invoke a writing surface by simply holding a physical planar surface, such as a pad of paper or the user's palm, within the field-of-view of exterior-facing image sensors.

As represented by block 602, the method 600 includes detecting a physical plane within an image stream of a physical environment, wherein the image stream is associated with a field-of-view (FOV) of the one or more exterior-facing image sensors. In some implementations, the computing system or a component thereof (e.g., the plane detector 440 in FIGS. 2 and 4C) uses plane detection and/or object recognition to detect the physical plane within the physical environment. As one example, a user holds the physical plane within the FOV in space relative to the physical environment. For example, the physical plane corresponds to a user's palm, a sheet of paper, a legal pad, a clipboard, a book, etc. In some implementations, the computing system obtains (e.g., receives, retrieves, or captures) the image stream of the physical environment. In some implementations, the physical plane was not previously presented within the FOV of the exterior-facing image sensors.

With reference to FIG. 5B, for example, the electronic device 120 detects the left hand 150 of the user 149 within the FOV 111 of the electronic device 120, where the palm of the left hand 150 of the user 149 is facing the exterior-facing image sensor(s) of the electronic device 120. As shown in FIG. 5B, during the instance 520, the electronic device 120 also presents a representation 151 of the left hand 150 of the user 149 within the XR environment 128. Furthermore, the electronic device 120 detects/identifies a current set of planes within the physical environment 105 including the surface of the table 107, the door 115, the walls of the physical environment 105, the floor of the physical environment 105, and the palm of the left hand 150 of the user 149. As such, the current set of planes in FIG. 5B (e.g., associated with the time T$_2$) includes at least one additional plane (e.g., the palm of the left hand 150 of the user 149) in comparison to the initial set of planes in FIG. 5A (e.g., associated with the time T$_1$).

In some implementations, the physical plane corresponds to (604) one of a sheet of paper, a pad of paper, a clipboard, a palm of a human being, or a book detected within the physical environment. As one example, FIGS. 5B and 5C illustrate a sequence in which the electronic device 120 presents a first XR surface 532 within the XR environment 128 in response to detecting a first physical plane within the physical environment 105 that corresponds to the palm of the left hand 150 of the user 149. As another example, FIGS. 5G and 5H illustrate a sequence in which the electronic device 120 presents a second XR surface 582 within the XR environment 128 in response to detecting a second physical plane within the physical environment 105 that corresponds to the pad of paper 572 being held by the left hand 150 of the user 149.

As represented by block 606, in response to detecting the physical plane within the image stream, the method 600 includes: obtaining (e.g., receiving, retrieving, or determining) pose values (e.g., translational and rotational values) for the physical plane; and presenting, at a first location, an extended reality (XR) surface provided to present marks via the display device, wherein the first location is based on the pose values for the physical plane. In some implementations, the computing system or a component thereof (e.g., the object tracking engine 510 in FIGS. 2 and 4A) obtains (e.g., receives, retrieves, or determines) pose values for the physical plane. In some implementations, the computing system or a component thereof (e.g., the rendering engine 450 in FIGS. 2 and 4C) presents the XR surface at the first location within the XR environment based on the pose values for the physical plane. As such, according to some implementations, the computing system includes logic for detecting planes within the image stream and subsequently tracking the detected planes with six degrees of freedom (6DOF) via CV and/or the like. As one example, the XR surface is coplanar with the physical plane. As another example, the XR surface may be offset from the physical plane by X cm in at least one translational dimension. As yet another example, the XR surface may be offset from the physical plane by Y° in at least one rotational dimension.

As one example, FIGS. 5B and 5C illustrate a sequence in which the electronic device 120 presents a first XR surface 532 within the XR environment 128 in response to detecting a first physical plane within the physical environment 105 that corresponds to the palm of the left hand 150 of the user 149. As another example, FIGS. 5G and 5H illustrate a sequence in which the electronic device 120 presents a second XR surface 582 within the XR environment 128 in response to detecting a second physical plane within the physical environment 105 that corresponds to the pad of paper 572 being held by the left hand 150 of the user 149.

In some implementations, the display device corresponds to a transparent lens assembly, and wherein the XR surface is projected onto the transparent lens assembly. In some implementations, the display device corresponds to a near-eye system, and wherein presenting the XR surface includes compositing the XR surface with one or more images of a physical environment captured by the one or more exterior-facing image sensors.

In some implementations, the XR surface is (608) coplanar with the physical plane. In some implementations, the spatial dimensions (e.g., depth, height, and width) of the XR surface are based on the dimensions of the physical plane. As one example, the XR surface and the physical plane have the same spatial dimensions. In another example, the XR surface has at least one larger spatial dimension as compared to the physical plane. In yet another example, the XR surface has at least one smaller spatial dimension as compared to the physical plane. With reference to FIG. 5C, for example, the electronic device 120 presents the first XR surface 532 at a location that is coplanar with the representation 151 of the left hand 150 of the user 149.

In some implementations, the XR surface is (610) substantially planar, and the XR surface may be offset in at least one spatial dimension relative to the physical plane. As one example, the XR surface may be offset by X cm in the x, y, and/or z dimensions relative the physical plane. With reference to FIG. 5H, for example, the electronic device 120 presents the second XR surface 582 at a location that may be offset in at least one spatial dimension (e.g., x, y, and/or z) relative to the representation 573 of the pad of paper 572.

As represented by block 612, in response to movement of the physical plane, the method 600 includes maintaining presentation of the XR surface at the first location. In some implementations, the computing system or a component thereof (e.g., the object tracking engine 510 in FIGS. 2 and 4A) detects movement of the physical plane within the physical environment 105. As one example, the XR surface remains presented at its initial location after the physical plane moves within the FOV of the exterior-facing image sensors. With reference to FIG. 5R, for example, the electronic device 120 maintains presentation of the XR surface 5152 at its initial location after detecting the translational movement 5176 of the pad of paper 572 in FIG. 5Q. As another example, the XR surface remains presented at its initial location after the physical plane is withdrawn from the FOV of the exterior-facing image sensors. With reference to FIG. 5D, the electronic device 120 maintains presentation of the first XR surface 532 at its initial location after detecting removal of the left hand 150 of the user 149 from the FOV 111 of the electronic device 120.

In some implementations, the method 600 includes: detecting movement of the physical plane to a second location within the physical environment (e.g. the second location corresponds to a coplanar orientation of the physical plane relative to a physical surface within the physical environment); after detecting the movement of the physical plane to the second location: maintaining presentation of the XR surface at the first location; detecting a marking input directed to the physical plane; and in response to detecting the marking input, presenting one or more marks on the XR surface based on spatial parameters of the marking input. For example, the physical surface corresponds to a tabletop, a desk, a countertop, etc. that is within the FOV of the one or more exterior-facing image sensors. For example, the user brings their palm down to a tabletop and continues to write thereon or, instead, on the tabletop.

For example, FIGS. 5Q and 5R illustrate a sequence in which the electronic device 120 maintains presentation of the XR surface 5152 at its initial location after detecting translational movement 5176 of the pad of paper 572 to a surface of the table 107 within the FOV 111 of the electronic device 120. In some implementations, while the FOV remains constant, the computing system detects the movement of the physical plane to the second location. In some implementations, the marking input corresponds to an indirect marking input. In some implementations, the computing system presents the one or more marks overlaid on the tabletop or user's palm in addition to presenting the one or more marks on the XR surface.

In some implementations, the method 600 includes: detecting movement of the physical plane outside of the FOV of the one or more exterior-facing image sensors; and in response to detecting the movement of the physical plane outside of the FOV of the one or more exterior-facing image sensors, maintaining presentation of the XR surface at the first location. With reference to FIG. 5I, for example, the electronic device 120 maintains presentation of the second XR surface 582 at the first location after detecting removal of the pad of paper 572 from the FOV 111 of the electronic device 120.

In some implementations, as represented by block 614, the method 600 includes: after presenting the XR surface, detecting a marking input directed to the XR surface; and in response to detecting the marking input, presenting one or more marks on the XR surface based on spatial parameters of the marking input. According to some implementations, the spatial parameters include displacement associated with the marking input, change of translational coordinates associated with the marking input, change of rotational coordinates associated with the marking input, rate of change of translational coordinates associated with the marking input, rate of change of rotational coordinates associated with the marking input, and/or the like. In some implementations, as represented by block 616, the method 600 includes expanding the XR surface in at least one spatial dimension as the one or more marks are presented on the XR surface in accordance with a determination that a magnitude of the marking input exceeds at least the one spatial dimension of the XR surface.

As one example, FIGS. 5E and 5F illustrate a sequence in which the electronic device 120 presents a mark 562 on the first XR surface 532 within the XR environment 128 in response to detecting a marking input 554 (e.g., a direct marking input) with a control device 552 (or a representation thereof) directed to the first XR surface 532. As another example, FIGS. 5R and 5S illustrate a sequence in which the electronic device 120 presents text 5192 on the XR surface 5152 within the XR environment 128 in response to detecting a marking input (e.g., an indirect marking input) with a control device 552 directed to the pad of paper 572.

In some implementations, as represented by block 618, the method 600 includes: after presenting the XR surface, detecting a speech input; and in response to detecting the speech input: generating text based on the speech input; and presenting the text on the XR surface. For example, FIGS. 5I and 5J illustrate a sequence in which the electronic device 120 presents text 5102 on the second XR surface 582 within the XR environment 128 in response to detecting a dictation input 592.

In some implementations, as represented by block 620, the method 600 includes expanding the XR surface in at least one spatial dimension as the text is presented on the XR surface in accordance with a determination that a character count of the text causes the text to exceed at least the one spatial dimension of the XR surface. In some implementations, the user can switch between the first and second XR surfaces based on gaze direction, speech commands, pointing gestures, hand/extremity proximity, and/or the like. For example, FIGS. 5J and 5K illustrate a sequence in which the electronic device 120 changes focus from the second XR surface 582 to the first XR surface 532 within the XR environment 128 in response to detecting a gaze direction directed to the first XR surface 532 for at least a predetermined or non-deterministic time period.

In some implementations, as represented by block 622, the method 600 includes: detecting a manipulation input directed to moving the XR surface; and in response to detecting the manipulation input, modifying the XR surface by at least one of translating the XR surface or rotating the XR surface in one or more dimensions. For example, FIGS. 5F and 5G illustrate a sequence in which the electronic device 120 translates the first XR surface 532 within the XR environment 128 in response to detecting a manipulation input 564 via hand/extremity tracking.

In some implementations, as represented by block 624, the method 600 includes: detecting a second physical plane within the image stream of the physical environment; in response to detecting the second physical plane within the image stream: determining pose values for the second physical plane; and presenting a second XR surface provided to present marks at a second location, wherein the second location is based on the pose values for the second physical plane. For example, FIGS. 5G-5I illustrate a sequence in which the electronic device 120 presents a second XR surface 582 within the XR environment 128 in response to detecting a second physical plane within the physical environment 105. In some implementations, the user is able to switch between the first and second XR surfaces based on gaze direction, speech commands, pointing gestures, hand/extremity proximity, and/or the like.

In some implementations, the method 600 includes: after detecting the detecting the physical plane within the image stream, detecting movement of a physical object within the physical environment towards the physical plane, and wherein the pose values are obtained for the physical plane and the XR surface is presented at the first location (e.g., the block 606) in response to detecting the physical plane within the image stream and in response to detecting the movement of the physical object and in accordance with a determination that the movement of the physical object causes the physical object to breach a distance threshold relative to the physical plane. As one example, the physical object corresponds to a physical proxy object detected within the physical environment that lacks a communication channel to the computing system such as a pencil, a pen, etc. As another example, the physical object corresponds to an electronic device with a wired or wireless communication channel to the computing system such as a stylus, a finger-wearable device, a handheld device, or the like. In some implementations, the proximity-based confirmation input associated with movement of the physical object towards the physical plane is replaced with a confirmation input based on gaze duration at the XR surface.

In some implementations, the method 600 includes: detecting movement of a physical object within the physical environment towards the physical plane; in response to detecting the movement of the physical object and in accordance with a determination that the movement of the physical object causes the physical object to breach a distance threshold relative to the physical plane, presenting feedback associated with the XR surface; and in response to detecting the movement of the physical object and in accordance with a determination that the movement of the physical object does not cause the physical object to breach the distance threshold relative to the physical plane, forgoing presenting the feedback associated with the XR surface. As one example, the physical object corresponds to a physical proxy object detected within the physical environment that lacks a communication channel to the computing system such as a pencil, a pen, etc. As another example, the physical object corresponds to an electronic device with a wired or wireless communication channel to the computing system such as a stylus, a finger-wearable device, a handheld device, or the like. According to some implementations, the feedback corresponds to at least one visual, audio, haptic, etc. feedback, such as a notification or other alert, that the XR surface is ready and available to detect and present marks. In some implementations, the proximity-based confirmation input associated with movement of the physical object towards the physical plane is replaced with a confirmation input based on gaze duration at the XR surface.

In some implementations, the distance threshold corresponds to a predefined distance value or a non-deterministic distance value that is based on current contextual information. In some implementations, the distance threshold corresponds to a predefined distance of X cm. In some implementations, the distance threshold corresponds to a non-deterministic value based on dimensions of the plane, distance between the plane and the computing system or the user, contextual information, and/or the like.

In some implementations, the physical object corresponds to an electronic device that is communicatively coupled to the computing system. For example, the physical object corresponds to a finger-wearable device, a wearable device, a stylus, a handheld device, or the like. In some implementations, the physical object corresponds to a physical proxy object that is not communicatively coupled to the computing system. For example, the physical proxy object corresponds to a pen, a pencil, a ruler, or the like.

In some implementations, the method 600 includes obtaining (e.g., receiving, retrieving, or determining) pose values for the physical object, wherein detecting the movement of the physical object corresponds to detecting a change to one of the translational or rotational values for the physical object. In some implementations, the computing system or a component thereof (e.g., the object tracking engine 510 in FIGS. 2 and 4A) tracks the physical object via CV, magnetic sensors, and/or the like. As one example, the physical object corresponds to a physical proxy object, such as a pencil, a pen, etc., without a communication channel to the computing system. As another example, the physical object corresponds to an electronic device, such as a stylus, finger-wearable device, or the like, with a wired or wireless communication channel to the computing system that includes an IMU, accelerometer, magnetometer, gyroscope, and/or the like for 6DOF tracking. In some implementations, obtaining the pose values for the physical object includes determining pose values for the physical object based on at least one of IMU data from the physical object, one or more images of a physical environment that include the physical object, magnetic tracking data, and/or the like.

FIG. 7 illustrates a flowchart representation of a method 700 of invoking an XR surface in response to detecting a physical plane added to a physical environment in accordance with some implementations. In various implementations, the method 700 is performed at a computing system including non-transitory memory and one or more processors, wherein the computing system is communicatively coupled to a display device, one or more exterior-facing image sensors, and one or more input devices (e.g., the electronic device 120 shown in FIGS. 1 and 3; the controller 110 in FIGS. 1 and 2; or a suitable combination thereof). In some implementations, the method 700 is performed by processing logic, including hardware, firmware, software, or a combination thereof. In some implementations, the method 700 is performed by a processor executing code stored in a non-transitory computer-readable medium (e.g., a memory). In some implementations, the computing system corresponds to one of a tablet, a laptop, a mobile phone, a near-eye system, a wearable computing device, or the like. In some implementations, the one or more input devices correspond to a computer vision (CV) engine that uses an image stream from the one or more exterior-facing image sensors, an object tracking engine, a head/body pose tracking engine, a finger/hand/extremity tracking engine, an eye tracking engine, a touch-sensitive surface, one or more microphones, and/or the like. FIG. 7 is similar to and adapted from FIGS. 6A and 6B. As such, common reference numbers are used in FIGS. 6A, 6B, and 7 and only the differences are described herein for the sake of brevity.

As discussed above, a user may invoke a note or a blank text entry document by launching an appropriate application. However, the application launch process may include several steps that could distract a user from their workflow. As such, in various implementations, a user may invoke a writing surface by simply holding a physical planar surface, such as a pad of paper or the user's palm, within the field-of-view of exterior-facing image sensors.

As represented by block 702, the method 700 includes obtaining (e.g., receiving, retrieving, or capturing) an image stream of a physical environment, wherein the image stream is associated with a field-of-view (FOV) of the one or more exterior-facing image sensors. In some implementations, the computing system or a component thereof (e.g., the image capture device 370 in FIGS. 3 and 4C) captures an image stream 435 of the physical environment 105 via one or more exterior-facing image sensors.

As represented by block 704, the method 700 includes detecting an initial set of planes associated with the physical environment based on the image stream. In some implementations, the computing system or a component thereof (e.g., the plane detector 440 in FIGS. 2 and 4C) uses plane detection and/or object recognition to detect the initial set of planes within the physical environment 105 based on the image stream 435. In some implementations, the computing system generates a mesh of the physical environment based on the image stream and detects the initial set of planes associated with the physical environment based on the mesh.

As represented by block 706, the method 700 includes detecting a physical plane within the image stream, wherein the detected physical plane is not included amongst the initial set of planes associated with the physical environment. In some implementations, the computing system or a component thereof (e.g., the plane detector 440 in FIGS. 2 and 4C) uses plane detection and/or object recognition to detect a current set of planes within the physical environment 105 including at least one physical plane not included among the initial set of planes.

With reference to FIG. 5B, for example, the electronic device 120 detects the left hand 150 of the user 149 within the FOV 111 of the electronic device 120, where the palm of the left hand 150 of the user 149 is facing the exterior-facing image sensor(s) of the electronic device 120. As such, in FIG. 5B, the electronic device 120 detects/identifies at least one additional plane (e.g., the palm of the left hand 150 of the user 149) in comparison to the initial set of planes in FIG. 5A. With reference to FIG. 5G, the electronic device 120 detects a pad of paper 572 being held by the left hand 150 of the user 149 within the FOV 111 of the electronic device 120. As such, in FIG. 5G, the electronic device 120 detects/identifies at least one additional plane (e.g., the pad of paper 572) in comparison to the initial set of planes in FIG. 5A or the set of planes associated with the previous time period in FIG. 5F.

As represented by block 606, in response to detecting the physical plane within the image stream, the method 700 includes: obtaining (e.g., receiving, retrieving, or determining) pose values (e.g., translational and rotational values) for the physical plane; and presenting, at a first location, an extended reality (XR) surface provided to present marks via the display device, wherein the first location is based on the pose values for the physical plane. In some implementations, the computing system or a component thereof (e.g., the object tracking engine 510 in FIGS. 2 and 4A) obtains (e.g., receives, retrieves, or determines) pose values for the physical plane. In some implementations, the computing system or a component thereof (e.g., the rendering engine 450 in FIGS. 2 and 4C) presents the XR surface at the first location within the XR environment based on the pose values for the physical plane. According to some implementations, while the FOV remains constant, the computing system detects the addition of the physical plane to the scene by the user, which, in turn, triggers the presentation of the XR surface.

As one example, FIGS. 5B and 5C illustrate a sequence in which the electronic device 120 presents a first XR surface 532 within the XR environment 128 in response to detecting a first physical plane within the physical environment 105 that corresponds to the palm of the left hand 150 of the user 149. As another example, FIGS. 5G and 5H illustrate a sequence in which the electronic device 120 presents a second XR surface 582 within the XR environment 128 in response to detecting a second physical plane within the physical environment 105 that corresponds to the pad of paper 572 being held by the left hand 150 of the user 149.

As represented by block 612, in response to movement of the physical plane, the method 700 includes maintaining presentation of the XR surface at the first location. In some implementations, the computing system or a component thereof (e.g., the object tracking engine 510 in FIGS. 2 and 4A) detects movement of the physical plane within the physical environment 105. With reference to FIG. 5R, for example, the electronic device 120 maintains presentation of the XR surface 5152 at its initial location after detecting the translational movement 5176 of the pad of paper 572 in FIG. 5Q. With reference to FIG. 5D, the electronic device 120 maintains presentation of the first XR surface 532 at its initial location after detecting removal of the left hand 150 of the user 149 from the FOV 111 of the electronic device 120.

Figure 8A:
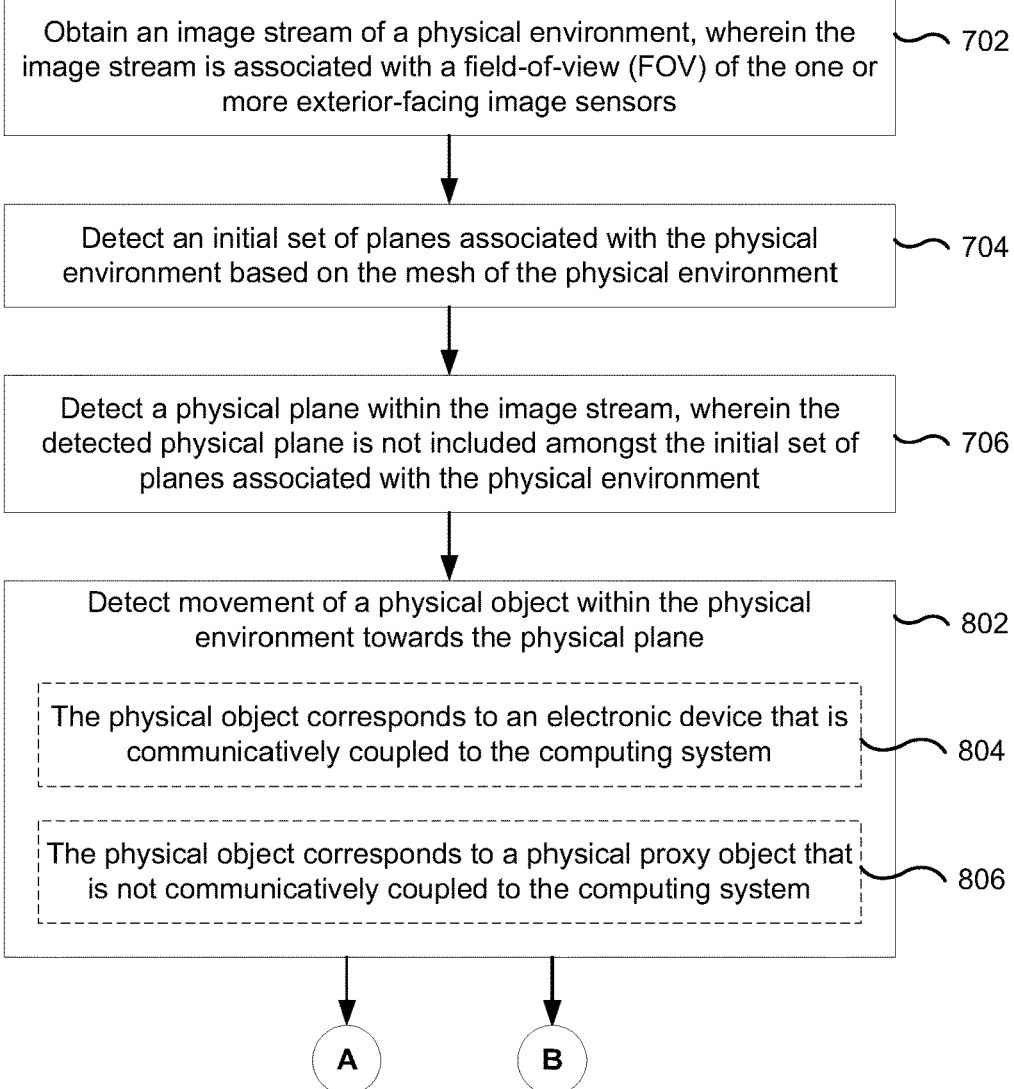

FIGS. 8A and 8B illustrate a flowchart representation of a method 800 of invoking an XR surface in response to detecting a physical plane added to a physical environment and in accordance with a determination that a proximity condition is satisfied in accordance with some implementations. In various implementations, the method 800 is performed at a computing system including non-transitory memory and one or more processors, wherein the computing system is communicatively coupled to a display device, one or more exterior-facing image sensors, and one or more input devices (e.g., the electronic device 120 shown in FIGS. 1 and 3; the controller 110 in FIGS. 1 and 2; or a suitable combination thereof). In some implementations, the method 800 is performed by processing logic, including hardware, firmware, software, or a combination thereof. In some implementations, the method 800 is performed by a processor executing code stored in a non-transitory computer-readable medium (e.g., a memory). In some implementations, the computing system corresponds to one of a tablet, a laptop, a mobile phone, a near-eye system, a wearable computing device, or the like. In some implementations, the one or more input devices correspond to a computer vision (CV) engine that uses an image stream from the one or more exterior-facing image sensors, an object tracking engine, a head/body pose tracking engine, a finger/hand/extremity tracking engine, an eye tracking engine, a touch-sensitive surface, one or more microphones, and/or the like. FIGS. 8A and 8B are similar to and adapted from FIGS. 6A, 6B, and 7. As such, common reference numbers are used in FIGS. 6A, 6B, 7, 8A, and 8B and only the differences are described herein for the sake of brevity.

As discussed above, a user may invoke a note or a blank text entry document by launching an appropriate application. However, the application launch process may include several steps that could distract a user from their workflow.

As such, in various implementations, a user may invoke a writing surface by simply holding a physical planar surface, such as a pad of paper or the user's palm, within the field-of-view of exterior-facing image sensors.

As represented by block 702, the method 800 includes obtaining (e.g., receiving, retrieving, or capturing) an image stream of a physical environment, wherein the image stream is associated with a field-of-view (FOV) of the one or more exterior-facing image sensors. In some implementations, the computing system or a component thereof (e.g., the image capture device 370 in FIGS. 3 and 4C) captures an image stream 435 of the physical environment 105 via one or more exterior-facing image sensors.

As represented by block 704, the method 800 includes detecting an initial set of planes associated with the physical environment based on the image stream. In some implementations, the computing system or a component thereof (e.g., the plane detector 440 in FIGS. 2 and 4C) uses plane detection and/or object recognition to detect the initial set of planes within the physical environment 105 based on the image stream 435. In some implementations, the computing system generates a mesh of the physical environment based on the image stream and detects the initial set of planes associated with the physical environment based on the mesh.

As represented by block 706, the method 800 includes detecting a physical plane within the image stream, wherein the detected physical plane is not included amongst the initial set of planes associated with the physical environment. In some implementations, the computing system or a component thereof (e.g., the plane detector 440 in FIGS. 2 and 4C) uses plane detection and/or object recognition to detect a current set of planes within the physical environment 105 including at least one physical plane not included among the initial set of planes.

With reference to FIG. 5B, for example, the electronic device 120 detects the left hand 150 of the user 149 within the FOV 111 of the electronic device 120, where the palm of the left hand 150 of the user 149 is facing the exterior-facing image sensor(s) of the electronic device 120. As such, in FIG. 5B, the electronic device 120 detects/identifies at least one additional plane (e.g., the palm of the left hand 150 of the user 149) in comparison to the initial set of planes in FIG. 5A. With reference to FIG. 5G, the electronic device 120 detects a pad of paper 572 being held by the left hand 150 of the user 149 within the FOV 111 of the electronic device 120. As such, in FIG. 5G, the electronic device 120 detects/identifies at least one additional plane (e.g., the pad of paper 572) in comparison to the initial set of planes in FIG. 5A or the set of planes associated with the previous time period in FIG. 5F.

As represented by block 802, the method 800 includes detecting movement of a physical object within the physical environment towards the physical plane. In some implementations, the computing system or a component thereof (e.g., the object tracking engine 510 in FIGS. 2 and 4A) detects movement of the physical plane within the physical environment 105.

In some implementations, the method 800 includes obtaining (e.g., receiving, retrieving, or determining) pose values (e.g., translational and rotational values) for the physical object, wherein detecting the movement of the physical object corresponds to detecting a change to one of the translational or rotational values for the physical object. In some implementations, the computing system or a component thereof (e.g., the object tracking engine 510 in FIGS. 2 and 4A) tracks the physical object via CV, magnetic sensors, and/or the like. As one example, the physical object corresponds to a physical proxy object, such as a pencil, a pen, etc., without a communication channel to the computing system. As another example, the physical object corresponds to an electronic device, such as a stylus, finger-wearable device, or the like, with a wired or wireless communication channel to the computing system that includes an IMU, accelerometer, magnetometer, gyroscope, and/or the like for 6DOF tracking. In some implementations, obtaining the pose values for the physical object includes determining pose values for the physical object based on at least one of IMU data from the physical object, one or more images of a physical environment that include the physical object, magnetic tracking data, and/or the like.

In some implementations, as represented by block 804, the physical object corresponds to an electronic device that is communicatively coupled to the computing system. For example, the physical object corresponds to a finger-wearable device, a wearable device, a stylus, a handheld device, or the like. With reference to FIG. 5E, for example, the electronic device 120 detects a control device 552 being held by the left hand 150 of the user 149 within the FOV 111 of the electronic device 120 via object tracking and/or hand/extremity tracking. For example, the control device 552 corresponds to a stylus or the like that communicates with the controller 110 and/or electronic device 120. For example, the control device 552 includes one or more processors, non-transitory memory, a communication interface, a touch-sensitive surface, one or more integrated pressure sensors, a magnetometer, an accelerometer, an IMU, a gyroscope, and/or the like.

In some implementations, as represented by block 806, the physical object corresponds to a physical proxy object that is not communicatively coupled to the computing system. For example, the physical proxy object corresponds to a pen, a pencil, a ruler, or the like. With reference to FIG. 5M, for example, the electronic device 120 detects a physical proxy object 5132 being held by the left hand 150 of the user 149 within the FOV 111 of the electronic device 120 via object tracking and/or hand/extremity tracking. For example, the physical proxy object 5132 corresponds to a ruler, a stick, or the like that does not communicate with the controller 110 and/or electronic device 120.

As represented by block 808, in response to detecting the movement of the physical object and in accordance with a determination that the movement of the physical object causes the physical object to breach a distance threshold relative to the physical plane (e.g., satisfaction of a proximity condition), the method 800 includes: obtaining pose values for the physical plane; and presenting, at a first location, an extended reality (XR) surface provided to present marks via the display device, wherein the first location is based on the pose values for the physical plane. For example, FIGS. 5L-5O illustrate a sequence in which the electronic device 120 presents an XR surface 5152 within the XR environment 128 in response to detecting a plane associated with the pad of paper 572 within the physical environment 105 and in accordance with a determination that a physical proxy object 5132 (or a representation thereof) breaches a predetermined or non-deterministic distance threshold relative to a representation 573 of the pad of paper 572. In other words, the proximity condition is satisfied in FIG. 5N.

In some implementations, as represented by block 810, the method 800 includes presenting feedback associated with the XR surface according to a determination that the physical object contacts the physical plane. For example, FIGS. 5P and 5Q illustrate a sequence in which the electronic device 120 presents feedback (e.g., audio and visual) indicating that the physical proxy object 5132 contacts the pad of paper 572.

In some implementations, the distance threshold corresponds to (812) a predefined distance value or a non-deterministic distance value that is based on current contextual information. In some implementations, the distance threshold corresponds to a predefined distance of X cm. In some implementations, the distance threshold corresponds to a non-deterministic value based on dimensions of the plane, distance between the plane and the computing system or the user, contextual information, and/or the like.

As represented by block 612, in response to movement of the physical plane, the method 800 includes maintaining presentation of the XR surface at the first location. In some implementations, the computing system or a component thereof (e.g., the object tracking engine 510 in FIGS. 2 and 4A) detects movement of the physical plane within the physical environment 105. With reference to FIG. 5R, for example, the electronic device 120 maintains presentation of the XR surface 5152 at its initial location after detecting the translational movement 5176 of the pad of paper 572 in FIG. 5Q. With reference to FIG. 5D, the electronic device 120 maintains presentation of the first XR surface 532 at its initial location after detecting removal of the left hand 150 of the user 149 from the FOV 111 of the electronic device 120.

As represented by block 814, in response to detecting the movement of the physical object and in accordance with a determination that the movement of the physical object does not cause the physical object to breach the distance threshold relative to the physical plane, the method 800 includes forgoing presentation of the XR surface. With reference to FIG. 5M, for example, the electronic device 120 forgoes presenting the XR surface in response to determining that the physical proxy object 5132 (or a representation thereof) held by the left hand 150 of the user 149 does not breach the predetermined or non-deterministic distance threshold 5134 relative to the pad of paper 572 via object tracking and/or hand/extremity tracking. In other words, the proximity condition is not satisfied in FIG. 5M.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first media item could be termed a second media item, and, similarly, a second media item could be termed a first media item, which changing the meaning of the description, so long as the occurrences of the "first media item" are renamed consistently and the occurrences of the "second media item" are renamed consistently.

The first media item and the second media item are both media items, but they are not the same media item.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at a computing system including non-transitory memory and one or more processors, wherein the computing system is communicatively coupled to a display device, one or more exterior-facing image sensors, and one or more input devices:

detecting, within an image stream, a physical plane added to a physical environment, wherein the image stream is associated with a field-of-view (FOV) of the one or more exterior-facing image sensors, and the physical plane is associated with a physical object within the FOV;

in response to detecting the physical plane within the image stream:

obtaining pose values for the physical plane by tracking the physical object; and presenting, at a first location, an extended reality (XR) surface provided to present marks via the display device, wherein the first location is based on the pose values for the physical plane; and in response to movement of the physical plane, including moving the physical object within the FOV or removing the physical object from the FOV, maintaining presentation of the XR surface at the first location for the marks.

2. The method of claim 1, further comprising:

prior to detecting the physical plane, obtaining the image stream of the physical environment associated with the FOV of the one or more exterior-facing image sensors; and detecting an initial set of planes associated with the physical environment based on the image stream of the physical environment, wherein the detected physical plane is not included amongst the initial set of planes associated with the physical environment.

3. The method of claim 1, further comprising:

detecting movement of the physical plane to a second location within the physical environment; and after detecting the movement of the physical plane to the second location:

maintaining presentation of the XR surface at the first location;

detecting a marking input directed to the physical plane; and in response to detecting the marking input, presenting, via the display device, one or more marks on the XR surface based on spatial parameters of the marking input.

4. The method of claim 1, further comprising:

detecting movement of the physical plane outside of the FOV of the one or more exterior-facing image sensors; and in response to detecting the movement of the physical plane outside of the FOV of the one or more exterior-facing image sensors, maintaining presentation of the XR surface at the first location.

5. The method of claim 1, further comprising:

after presenting the XR surface, detecting a marking input directed to the XR surface; and in response to detecting the marking input, presenting one or more marks on the XR surface based on spatial parameters of the marking input.

6. The method of claim 5, further comprising:

expanding the XR surface in at least one spatial dimension as the one or more marks are presented on the XR surface in accordance with a determination that a magnitude of the marking input exceeds at least the one spatial dimension of the XR surface.

7. The method of claim 1, further comprising:

after presenting the XR surface, detecting a speech input; and in response to detecting the speech input:

generating text based on the speech input; and presenting the text on the XR surface.

8. The method of claim 7, further comprising:

expanding the XR surface in at least one spatial dimension as the text is presented on the XR surface in accordance with a determination that a character count of the text causes the text to exceed at least the one spatial dimension of the XR surface.

9. The method of claim 1, further comprising:

detecting a manipulation input directed to moving the XR surface; and in response to detecting the manipulation input, modifying the XR surface by at least one of translating the XR surface or rotating the XR surface in one or more dimensions.

10. A device comprising:

one or more processors;

a non-transitory memory;

an interface for communicating with a display device, one or more exterior-facing image sensors, and one or more input devices; and one or more programs stored in the non-transitory memory, which, when executed by the one or more processors, cause the device to:

detect, within an image stream, a physical plane added to a physical environment, wherein the image stream is associated with a field-of-view (FOV) of the one or more exterior-facing image sensors, and the physical plane is associated with a physical object within the FOV;

in response to detecting the physical plane within the image stream:

obtain pose values for the physical plane by tracking the physical object; and present, at a first location, an extended reality (XR) surface provided to present marks via the display device, wherein the first location is based on the pose values for the physical plane; and in response to movement of the physical plane, including moving the physical object within the FOV or removing the physical object from the FOV, maintain presentation of the XR surface at the first location.

11. The device of claim 10, wherein the one or more programs stored in the non-transitory memory, which, when executed by the one or more processors, further cause the device to:

prior to detecting the physical plane, obtain the image stream of the physical environment associated with the FOV of the one or more exterior-facing image sensors; and detect an initial set of planes associated with the physical environment based on the image stream of the physical environment, wherein the detected physical plane is not included amongst the initial set of planes associated with the physical environment.

12. The device of claim 10, wherein the one or more programs stored in the non-transitory memory, which, when executed by the one or more processors, further cause the device to:

detect movement of the physical plane to a second location within the physical environment; and after detecting the movement of the physical plane to the second location:

maintain presentation of the XR surface at the first location;

detect a marking input directed to the physical plane; and in response to detecting the marking input, present, via the display device, one or more marks on the XR surface based on spatial parameters of the marking input.

13. The device of claim 10, wherein the one or more programs stored in the non-transitory memory, which, when executed by the one or more processors, further cause the device to:

detect movement of the physical plane outside of the FOV of the one or more exterior-facing image sensors; and in response to detecting the movement of the physical plane outside of the FOV of the one or more exterior-facing image sensors, maintain presentation of the XR surface at the first location.

14. The device of claim 10, wherein the one or more programs stored in the non-transitory memory, which, when executed by the one or more processors, further cause the device to:

after presenting the XR surface, detect a marking input directed to the XR surface; and in response to detecting the marking input, present one or more marks on the XR surface based on spatial parameters of the marking input.

15. A non-transitory memory storing one or more programs, which, when executed by one or more processors of a device with an interface for communicating with a display device, one or more exterior-facing image sensors, and one or more input devices, cause the device to:

detect, within an image stream, a physical plane added to a physical environment, wherein the image stream is associated with a field-of-view (FOV) of the one or more exterior-facing image sensors, and the physical plane is associated with a physical object within the FOV;

in response to detecting the physical plane within the image stream:

obtain pose values for the physical plane by tracking the physical object; and present, at a first location, an extended reality (XR) surface provided to present marks via the display device, wherein the first location is based on the pose values for the physical plane; and in response to movement of the physical plane, including moving the physical object within the FOV or removing the physical object from the FOV, maintain presentation of the XR surface at the first location.

16. The non-transitory memory of claim 15, wherein the one or more programs, which, when executed by the one or more processors of the device, further cause the device to:

detect a second physical plane within the image stream of the physical environment; and in response to detecting the second physical plane within the image stream:

determine pose values for the second physical plane; and present a second XR surface provided to present marks at a second location, wherein the second location is based on the pose values for the second physical plane.

17. The non-transitory memory of claim 15, wherein the physical plane corresponds to one of a sheet of paper, a pad of paper, a clipboard, a palm of a human being, or a book detected within the physical environment.

18. The non-transitory memory of claim 15, wherein the XR surface is coplanar with the physical plane.

19. The non-transitory memory of claim 15, wherein the XR surface is substantially planar, and wherein the XR surface is offset in at least one spatial dimension relative to the physical plane.

20. The non-transitory memory of claim 15, wherein the display device corresponds to a transparent lens assembly, and wherein presenting the XR content includes projecting the XR content onto the transparent lens assembly.

21. The non-transitory memory of claim 15, wherein the display device corresponds to a near-eye system, and wherein presenting the XR content includes compositing the XR content with one or more images of the physical environment captured by an exterior-facing image sensor.

22. The non-transitory memory of claim 15, wherein the one or more programs, which, when executed by the one or more processors of the device, further cause the device to:

after detecting the physical plane within the image stream, detect movement of a different physical object within the physical environment towards the physical plane, and wherein the pose values are obtained for the physical plane and the XR surface is presented at the first location in response to detecting the physical plane within the image stream and in response to detecting the movement of the different physical object and in accordance with a determination that the movement of the different physical object causes the different physical object to breach a distance threshold relative to the physical plane.

23. The non-transitory memory of claim 15, wherein the one or more programs, which, when executed by the one or more processors of the device, further cause the device to:

detect movement of a different physical object within the physical environment towards the physical plane;

in response to detecting the movement of the different physical object and in accordance with a determination that the movement of the different physical object causes the different physical object to breach a distance threshold relative to the physical plane, present feedback associated with the XR surface; and in response to detecting the movement of the different physical object and in accordance with a determination that the movement of the different physical object does not cause the different physical object to breach the distance threshold relative to the physical plane, forgo presenting the feedback associated with the XR surface.

24. The non-transitory memory of claim 15, wherein the distance threshold corresponds to a predefined distance value or a non-deterministic distance value that is based on current contextual information.

\* \* \* \* \*